(12) United States Patent
Grossgebauer et al.

(10) Patent No.: US 9,556,928 B2
(45) Date of Patent: Jan. 31, 2017

(54) ROTARY VIBRATION DAMPING ARRANGEMENT

(71) Applicant: ZF FRIEDRICHSHAFEN AG, Friedrichshafen (DE)

(72) Inventors: Uwe Grossgebauer, Erlabrunn (DE); Thomas Doegel, Nuedlingen (DE); Armin Stuermer, Rannungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 211 days.

(21) Appl. No.: 14/391,052

(22) PCT Filed: Mar. 11, 2013

(86) PCT No.: PCT/EP2013/054812
§ 371 (c)(1),
(2) Date: Oct. 7, 2014

(87) PCT Pub. No.: WO2013/152908
PCT Pub. Date: Oct. 17, 2013

(65) Prior Publication Data
US 2015/0122605 A1 May 7, 2015

(30) Foreign Application Priority Data

Apr. 10, 2012 (DE) .................. 10 2012 205 797

(51) Int. Cl.
*F16F 15/14* (2006.01)
*F16H 45/02* (2006.01)
(Continued)

(52) U.S. Cl.
CPC ............ *F16F 15/1421* (2013.01); *F16F 7/116* (2013.01); *F16H 45/02* (2013.01); *F16F 15/1202* (2013.01);
(Continued)

(58) Field of Classification Search
None
See application file for complete search history.

(56) References Cited

U.S. PATENT DOCUMENTS 5,090,945 A * 2/1992 Graton ............... F16F 15/1202
464/64.1
6,601,472 B1 8/2003 Baron

FOREIGN PATENT DOCUMENTS

DE 3825258 2/1990
DE 102010049553 5/2011
(Continued)

*Primary Examiner* — Colby M Hansen
(74) *Attorney, Agent, or Firm* — Cozen O'Connor

(57) ABSTRACT

A torsional vibration damping arrangement, comprises at least one deflection mass pendulum unit with a rotatable carrier, a deflection mass, a deformable restoring element, a supporting element which provides the carrier supporting region, wherein a distance between the carrier supporting region and the deflection mass supporting region can be varied through movement of the supporting element at the carrier, and the supporting element is preloaded in direction of a radially inner base position and is displaceable radially outward against the preloading under centrifugal force action wherein that a radial distance of the supporting element from the base position increases degressively with increasing centrifugal force action at least in one rotational speed range and/or in that a spring stiffness of the restoring element increases progressively at least in one rotational speed range through centrifugal force-induced displacement of the supporting element.

29 Claims, 19 Drawing Sheets

(51) Int. Cl.
*F16F 7/116* (2006.01)
*F16F 15/12* (2006.01)
(52) U.S. Cl.
CPC .................. *F16H 2045/0231* (2013.01); *F16H 2045/0263* (2013.01)

(56) References Cited

FOREIGN PATENT DOCUMENTS

DE 102010053542 6/2011
WO WO2012/168026 12/2012

\* cited by examiner

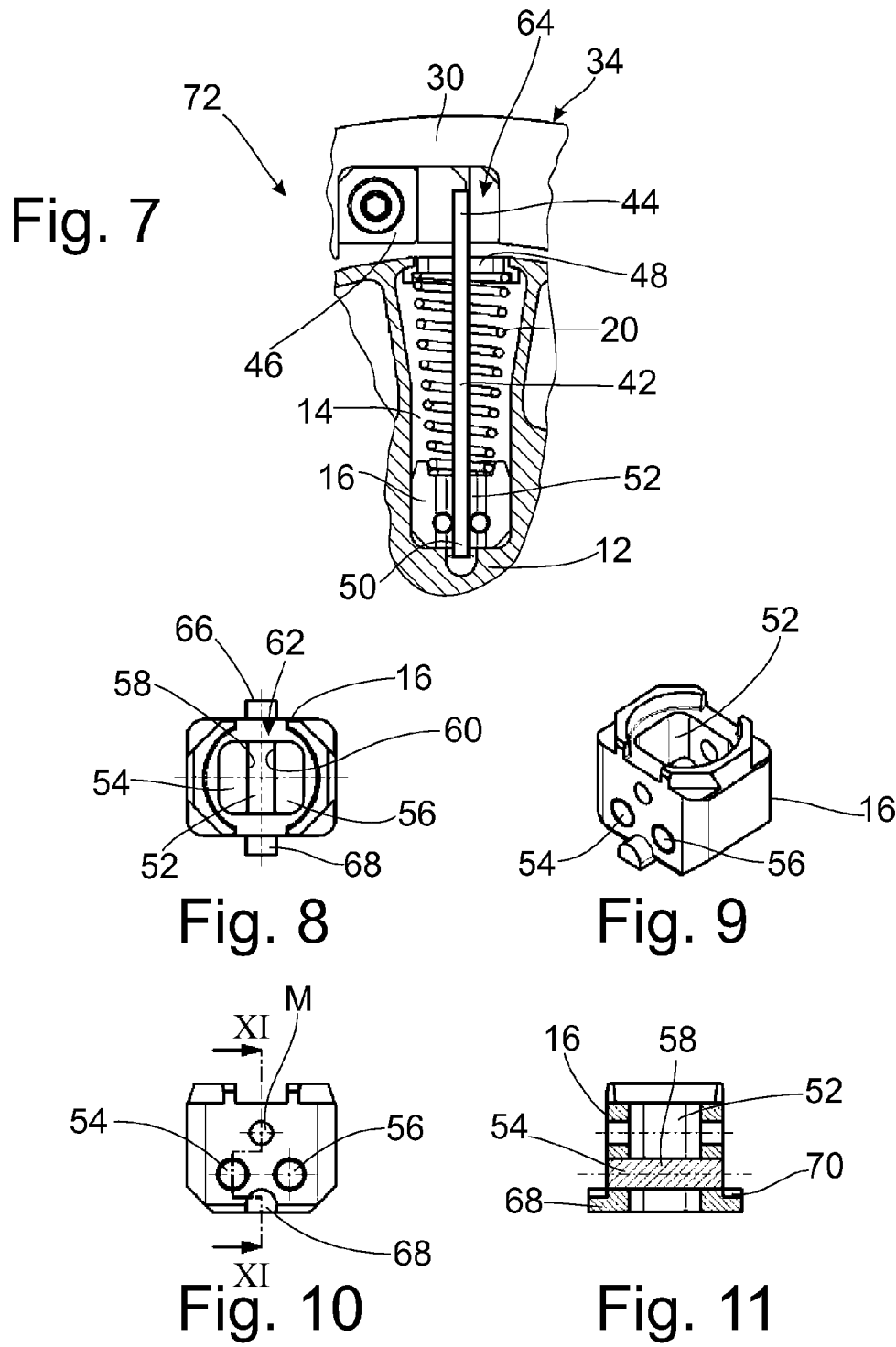

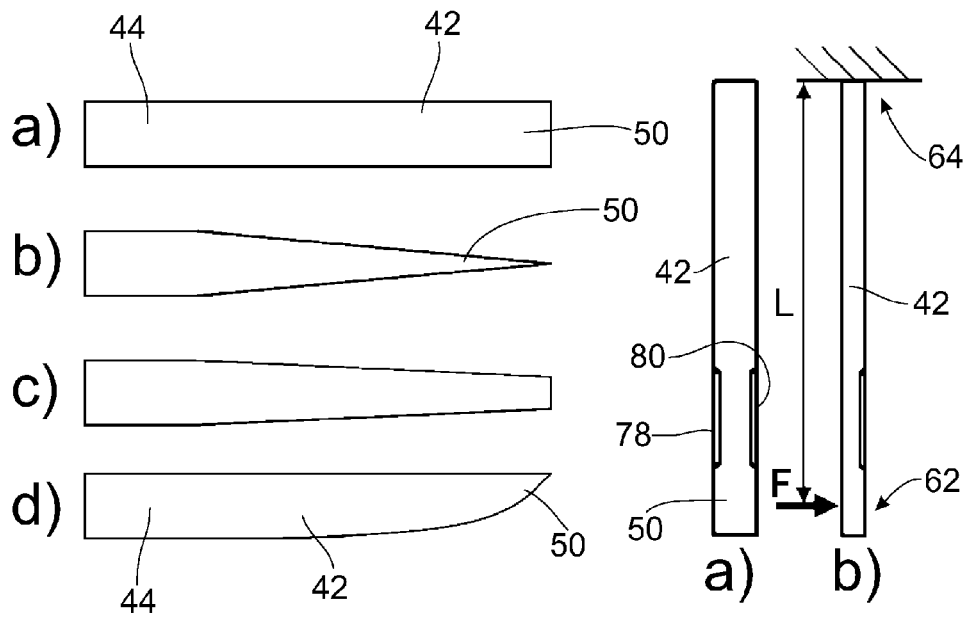
Fig. 20
Fig. 21
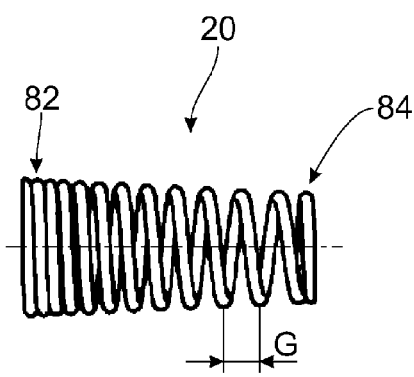
Fig. 22

ROTARY VIBRATION DAMPING ARRANGEMENT

FIELD OF THE INVENTION

The present invention is directed to a torsional vibration damping arrangement comprising at least one deflection mass pendulum unit.

BACKGROUND OF THE INVENTION

The present invention is directed to a torsional vibration damping arrangement, preferably for the drivetrain of a vehicle, comprising at least one deflection mass pendulum unit with a carrier which is rotatable around an axis of rotation, a deflection mass which can be deflected around the axis of rotation in circumferential direction with respect to the carrier, a deformable restoring element which is supported or supportable in a carrier supporting region with respect to the carrier and in a deflection mass supporting region with respect to the deflection mass, wherein a deflection of the deflection mass in at least one direction from a basic relative position with respect to the carrier causes a deformation of the restoring element, a supporting element which is radially movably supported at the carrier and provides the carrier supporting region, wherein a distance between the carrier supporting region and the deflection mass supporting region can be varied through movement of the supporting element at the carrier, and the supporting element is preloaded in direction of a radially inner base position and is displaceable radially outward proceeding from the base position against the preloading under centrifugal force action during rotation of the carrier around the axis of rotation.

DE 10 2010 053 542 A1 discloses a torsional vibration damping arrangement in which deflection mass pendulum units comprise a deflection mass which is arranged annularly around the carrier and is supported in circumferential direction with respect to the carrier by means of a plurality of elastically deformable restoring elements which are secured thereto and extend radially inward. Provided in the carrier are radially displaceable supporting elements at which the radially inwardly extending restoring elements can be supported in circumferential direction at respective carrier supporting regions. The supporting elements are preloaded radially inward into a base position by preloading springs which are associated with these supporting elements and supported at the deflection mass. When there is little or no centrifugal force load, the supporting elements are held in the base position under preloading action. As the rotational speed increases, the supporting elements shift radially outward as a result of centrifugal force accompanied by increasing compression of the preloading springs so that the carrier supporting regions at which the restoring elements extending radially inward from the deflection mass can be supported are displaced radially outward. This alters the free length of the restoring elements that is available for deflection between the connection thereof to the deflection mass and the respective carrier supporting regions in which they are supported via the supporting elements in circumferential direction with respect to the carrier. Accordingly, this variation of the free length also influences the effective pendulum length, shortening of which results in an increase in the natural frequency of the deflection mass pendulum units. As a result, the stiffness and therefore also the natural frequency of the deflection mass pendulum units is variable in a speed-dependent manner such that as the rotational speed increases the stiffness and therefore also the natural frequency increases. This is an attempt to achieve a rotational speed adaptation of the deflection mass pendulum units to a vibration excitation order.

SUMMARY OF THE INVENTION

It is an object of the present invention to provide a torsional vibration damping arrangement by which an improved adaptation to an excitation order can be achieved throughout the speed spectrum.

According to the invention, this object is met through a torsional vibration damping arrangement, preferably for the drivetrain of a vehicle, comprising at least one deflection mass pendulum unit with a carrier which is rotatable around an axis of rotation, a deflection mass which can be deflected around the axis of rotation in circumferential direction with respect to the carrier, a deformable restoring element which is supported or supportable in a carrier supporting region with respect to the carrier and in a deflection mass supporting region with respect to the deflection mass, wherein a deflection of the deflection mass in at least one direction from a basic relative position with respect to the carrier causes a deformation of the restoring element, a supporting element which is radially movably supported at the carrier and provides the carrier supporting region, wherein a distance between the carrier supporting region and the deflection mass supporting region can be varied through movement of the supporting element at the carrier, and the supporting element is preloaded in direction of a radially inner base position and is displaceable radially outward proceeding from the base position against the preloading under centrifugal force action during rotation of the carrier around the axis of rotation.

It is further provided in this connection that a radial distance of the supporting element from the base position increases degressively with increasing centrifugal force action at least in one rotational speed range and/or that a spring stiffness of the restoring element increases progressively at least in one rotational speed range through centrifugal force-induced, i.e., speed-dependent, displacement of the supporting element.

With the torsional vibration damping arrangement constructed according to the invention it can be ensured through the degressive increase in the radial distance of the supporting element from the base position with increasing rotational speed and/or the progressive increase in the spring stiffness of the restoring element brought about by the speed-dependent displacement of the supporting element that a substantially linear increase in the natural frequency of the deflection mass pendulum unit is achieved over the whole rotational speed. A substantially linear increase of this type in turn makes it possible to adjust the natural frequency of the vibrational system, i.e., of the deflection mass pendulum units, in correlation with the excitation frequency of an excitation order caused by periodic ignitions in an internal combustion engine, for example, which excitation frequency also increases with increasing rotational speed.

It is noted in this connection that within the meaning of the present invention the expression "degressively increasing" means that basically an increase takes place, but with a decreasing rate of change, i.e., with a decreasing gradient. Correspondingly, the expression "progressively increasing" means that basically when an increase takes place the rate of change, i.e., the gradient, increases.

To adapt or adjust to an excitation order in an optimal manner, it is further suggested that a relationship between rotational speed and spring stiffness of the restoring element has a parabolic shape.

The restoring behavior of the restoring element can be influenced in a defined manner particularly easily when the restoring element comprises a restoring spring, preferably a flexible spring implemented as a rod spring, preferably with a substantially linear force characteristic.

In order to ensure a defined positioning of the restoring element in the deflection mass pendulum arrangement, it is suggested that the restoring element be fixed with respect to the deflection mass and/or with respect to the carrier.

A radial displacement of the supporting element at comparatively low rotational speed can be prevented in that the supporting element is acted upon in the base position by a preloading force. In this way it can be ensured that the deflection mass pendulum unit first undergoes a change in its natural frequency when a determined limiting speed has been exceeded.

The preloading of the supporting element into or in the base position can be achieved in that a preloading arrangement, preferably a preloading spring, which preloads the supporting element in direction of the base position is associated with the supporting element.

According to a particularly advantageous embodiment, the preloading arrangement has a progressive, preferably parabolic, preloading characteristic curve. Here also, the expression "progressive" means that the reaction force of the preloading arrangement increases over-proportionally, i.e., with increasing gradient, as the load, i.e., for example compression, of the preloading arrangement increases.

A defined movement of the supporting element under centrifugal force load can be ensured in that a guide for the supporting element is provided at the carrier, wherein the supporting element is guided at the guide preferably so as to be movable substantially in radial direction, preferably with circumferential movement play.

For transmission of reaction forces between the deflection mass and the carrier, the supporting element can have a circumferential supporting region on at least one circumferential side of the restoring element for providing the carrier supporting region. When the supporting element has a circumferential support region on both circumferential sides of the restoring element, a reaction force support can be achieved at one and the same supporting element for both relative deflections of the deflection mass with respect to the carrier.

In order to prevent friction-related blocking of the supporting element at the restoring element, it is suggested that the restoring element be arranged between the circumferential supporting regions with circumferential movement play.

In a stably operating embodiment which can be realized in a simple construction it is suggested that the supporting element has a through-aperture for the restoring element and is movable along the restoring element, wherein a center of mass of the supporting element preferably lies in the region of the through-aperture. Particularly when the center of mass lies in the region of the through-aperture, it can be ensured that the centrifugal force action can largely also not cause a tilting of the supporting element leading to jamming.

When the at least one deflection mass pendulum unit is arranged in a housing which is filled or fillable with fluid, a lubricating effect can be guaranteed at the same time by means of this fluid so that the supporting element can move with as little friction as possible relative to the carrier and relative to the restoring element.

In order to utilize the vibration damping characteristic or tuned mass damping characteristic in the torsional vibration damping arrangement according to the invention as efficiently as possible, it is suggested that a plurality of deflection mass pendulum units is preferably provided at a substantially uniform circumferential distance relative to one another around the axis of rotation. To this end, the supporting elements of at least two, preferably all, of the deflection mass pendulum units can be supported so as to be movable toward a common carrier.

A constructional linking of a plurality of deflection mass pendulum units can be achieved when at least one deflection mass provides a common deflection mass for at least two, preferably all, deflection mass pendulum units. In particular, it can be provided for this purpose that the common deflection mass comprises a deflection mass ring which is arranged such that it annularly surrounds, e.g., the carrier and the axis of rotation thereof and is supported or supportable at a plurality of circumferential positions by means of a plurality of restoring elements in circumferential direction with respect to the carrier.

According to a further aspect of the present invention, the above-stated object is met by a torsional vibration damping arrangement, preferably for the drivetrain of a vehicle, comprising at least one deflection mass pendulum unit with a carrier which is rotatable around an axis of rotation, a deflection mass which can be deflected around the axis of rotation in circumferential direction with respect to the carrier, a deformable restoring element which is supported or supportable in a carrier supporting region with respect to the carrier and in a deflection mass supporting region with respect to the deflection mass, wherein a deflection of the deflection mass in at least one direction from a basic relative position with respect to the carrier causes a deformation of the restoring element, a supporting element which is radially movably supported at the carrier and provides the carrier supporting region, wherein a distance between the carrier supporting region and the deflection mass supporting region can be varied through movement of the supporting element at the carrier, and the supporting element is preloaded in direction of a radially inner base position and is displaceable radially outward proceeding from the base position against the preloading under centrifugal force action during rotation of the carrier around the axis of rotation. To this end, it is further provided that the supporting element has a circumferential supporting region for providing the carrier supporting region at only one circumferential side of the restoring element.

As a result of this aspect which represents an independent inventive idea and which, of course, can also generate particular advantages in connection with the aspects mentioned above, it is possible to ensure a circumferential support only in a half-phase of a respective oscillation period so that the supporting element can be relieved in the other half-phase and so as to achieve radial displacement of the supporting element substantially without frictional effects.

The invention is further directed to a drivetrain for a vehicle with at least one torsional vibration damping arrangement constructed according to the invention.

To this end, it can be provided that the drivetrain comprises a starting element, preferably hydrodynamic torque converter or fluid clutch or wet friction clutch or dry friction clutch, and that at least one torsional vibration damping arrangement is provided in the region of the starting element.

The starting element can comprise a turbine, i.e., constructed, for example, as hydrodynamic torque converter, wherein the turbine then advantageously provides at least a portion of the deflection mass of a torsional vibration damping arrangement.

According to a further advantageous aspect, it can be provided for more extensive vibration damping that the drivetrain comprises at least one torsional vibration damper with a primary side and a secondary side which is rotatable with respect to the primary side against the restoring action of a damper spring arrangement, wherein at least one torsional vibration damping arrangement is provided in the region of at least one torsional vibration damper. A torsional vibration damper of this type having a primary side, secondary side and a damper spring arrangement operative therebetween, i.e., constructed, for example, in the manner of a dual-mass flywheel or the like, serves in a drivetrain principally also for torque transmission, while the above-mentioned torsional vibration damping arrangement and restoring element or restoring elements thereof is generally not utilized for transmitting the torque to be transmitted in a drivetrain but rather is coupled to components which transmit torque and which are excited to vibration in so doing so as to allow a substantially free oscillation of the deflection mass at least in predetermined operating phases.

It can further be provided, for example, that two torsional vibration dampers are provided in series with one another in the torque path, wherein a secondary side of one torsional vibration damper is coupled with a primary side of the other torsional vibration damper for providing an intermediate mass, wherein at least one torsional vibration damping arrangement is provided in the region of the intermediate mass.

BRIEF DESCRIPTION OF THE DRAWINGS

The present invention will be described in detail in the following with reference to the accompanying drawings in which:

FIGS. 5a, 5b are two longitudinal sectional views of an annularly formed deflection mass in different section planes;

FIG. 7 is a detail of a deflection mass pendulum unit;

FIG. 8 is a view of a supporting element of the deflection mass pendulum unit viewed from the radially outer side;

FIG. 9 is a perspective view of the supporting element of FIG. 8;

FIG. 10 is a side view of the supporting element of FIG. 8;

FIG. 11 is a view of the supporting element of FIG. 8 in section along a line XI-XI in FIG. 10;

FIGS. 20a-d are views of different mode of constructions of restoring elements configured as leaf springs or bending beams;

FIG. 21 is a front view a) and side view b) of a further restoring element formed as leaf spring or bending beam;

FIG. 22 is a side view of a preloading spring for a supporting element;

DETAILED DESCRIPTION OF THE PRESENTLY PREFERRED EMBODIMENTS

Figure 1:
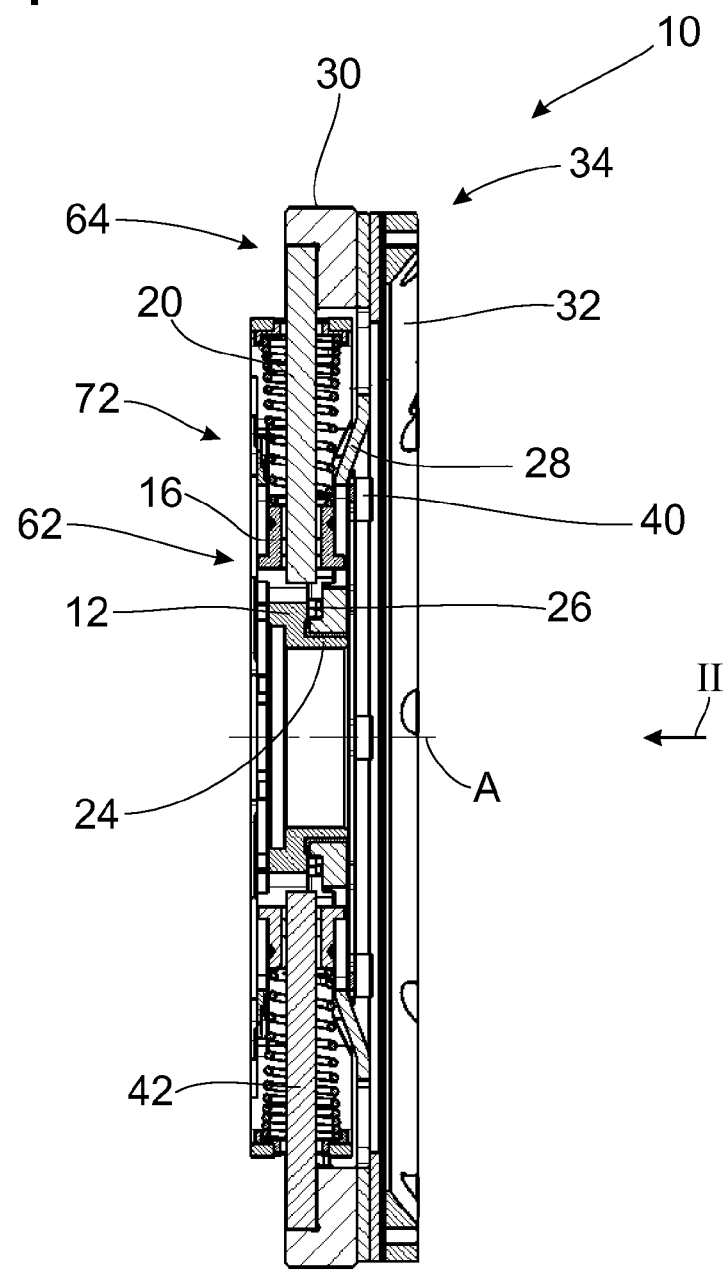
FIG. 1 is a longitudinal sectional view of a torsional vibration damping arrangement.
Figure 2:
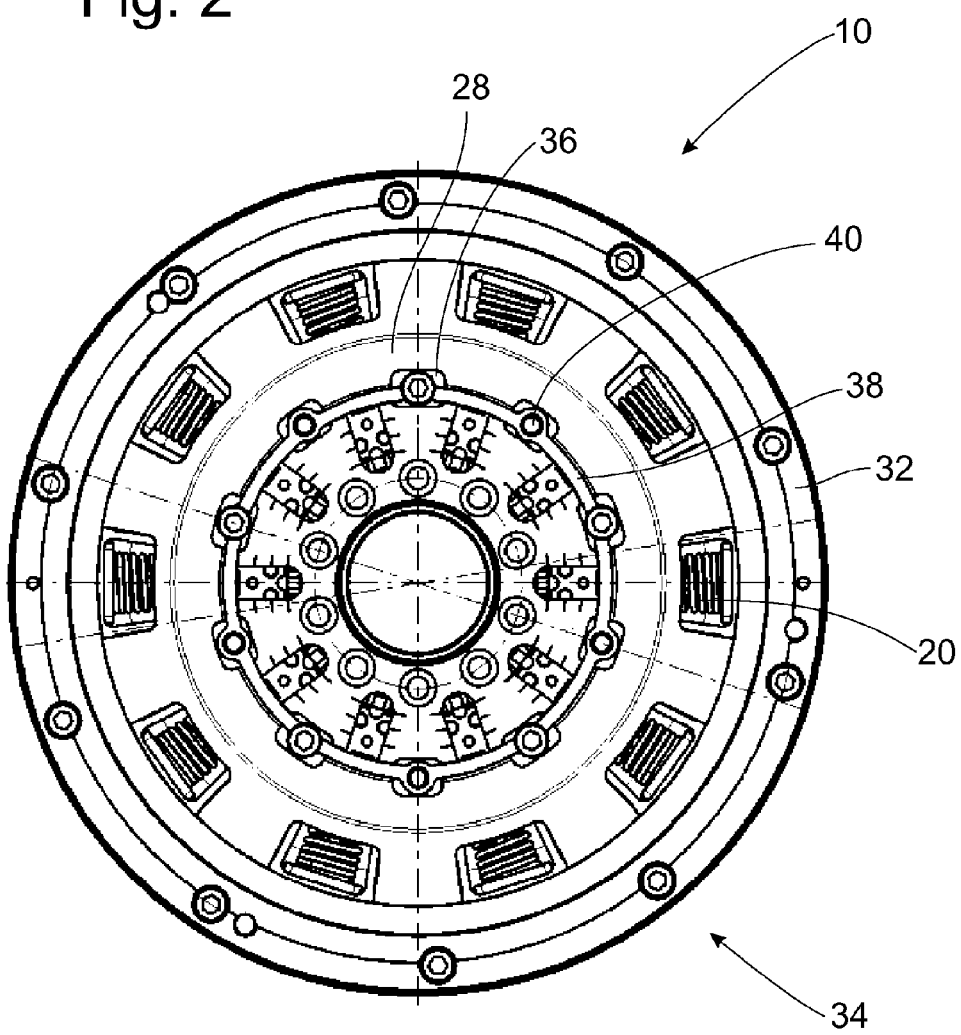
FIG. 2 is an axial view of the torsional vibration damping arrangement of FIG. 1 in viewing direction II in FIG. 1.
Figure 3:
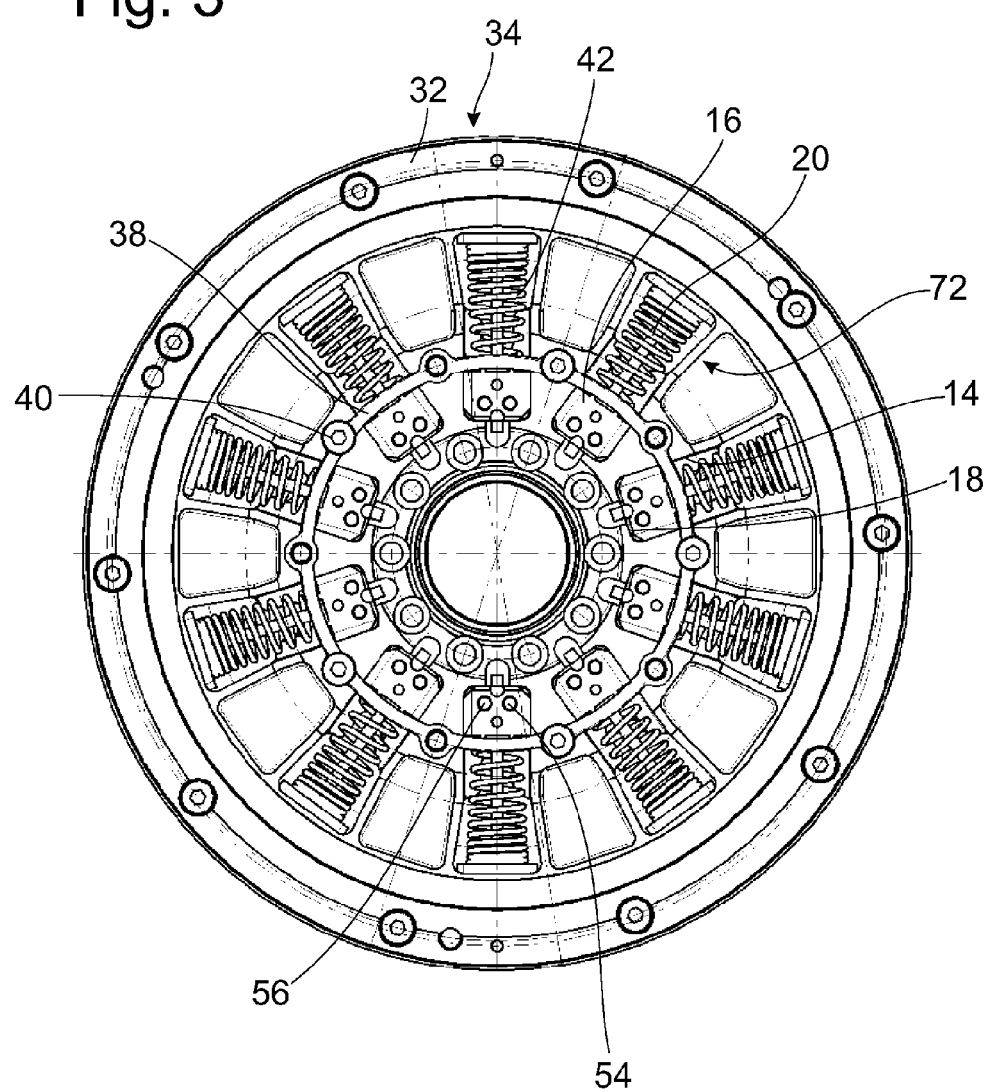
FIG. 3 is a view corresponding to FIG. 2 in which a carrier disk of an annularly formed deflection mass is omitted.
Figure 4:
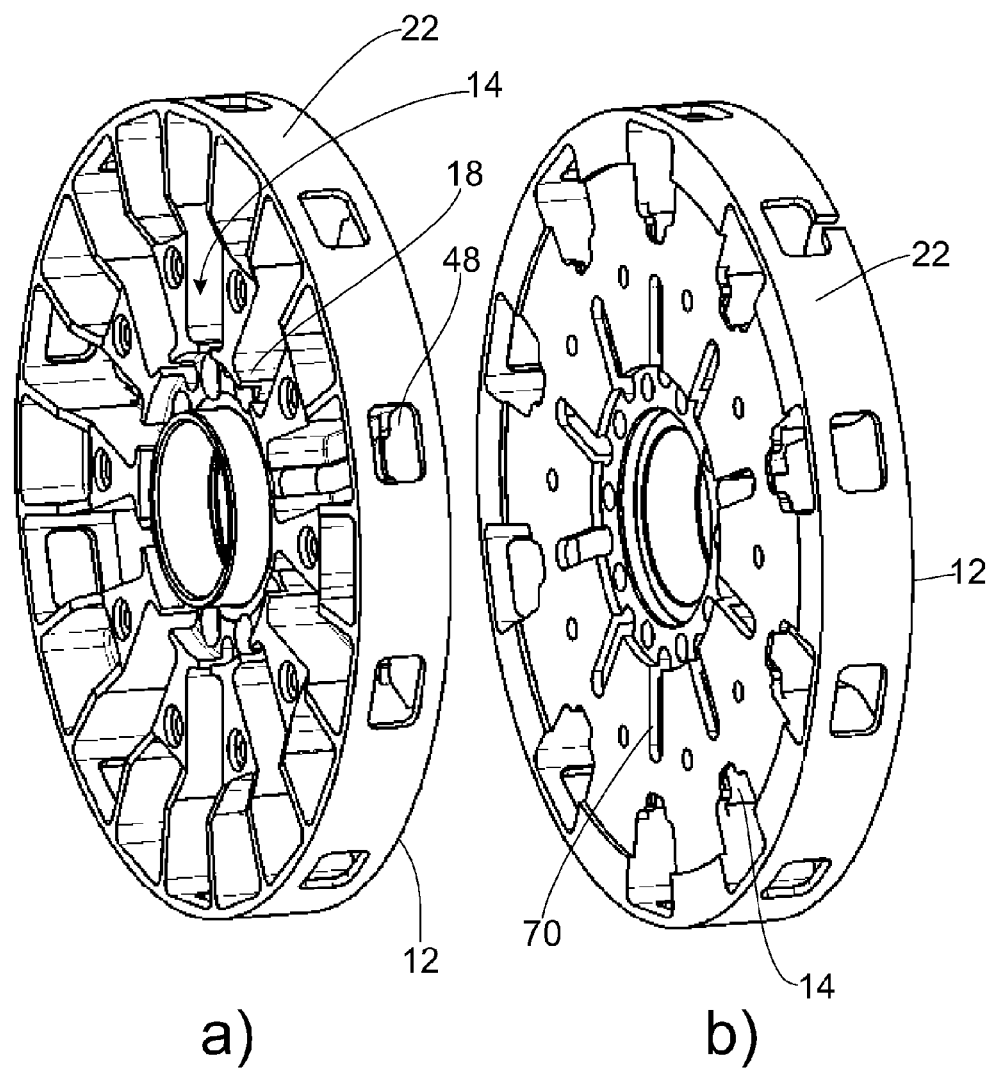
FIGS. 4a, 4b are two perspective views of a carrier of the torsional vibration damping arrangement of FIG. 1 viewed from different sides.
Figures 5, 6:
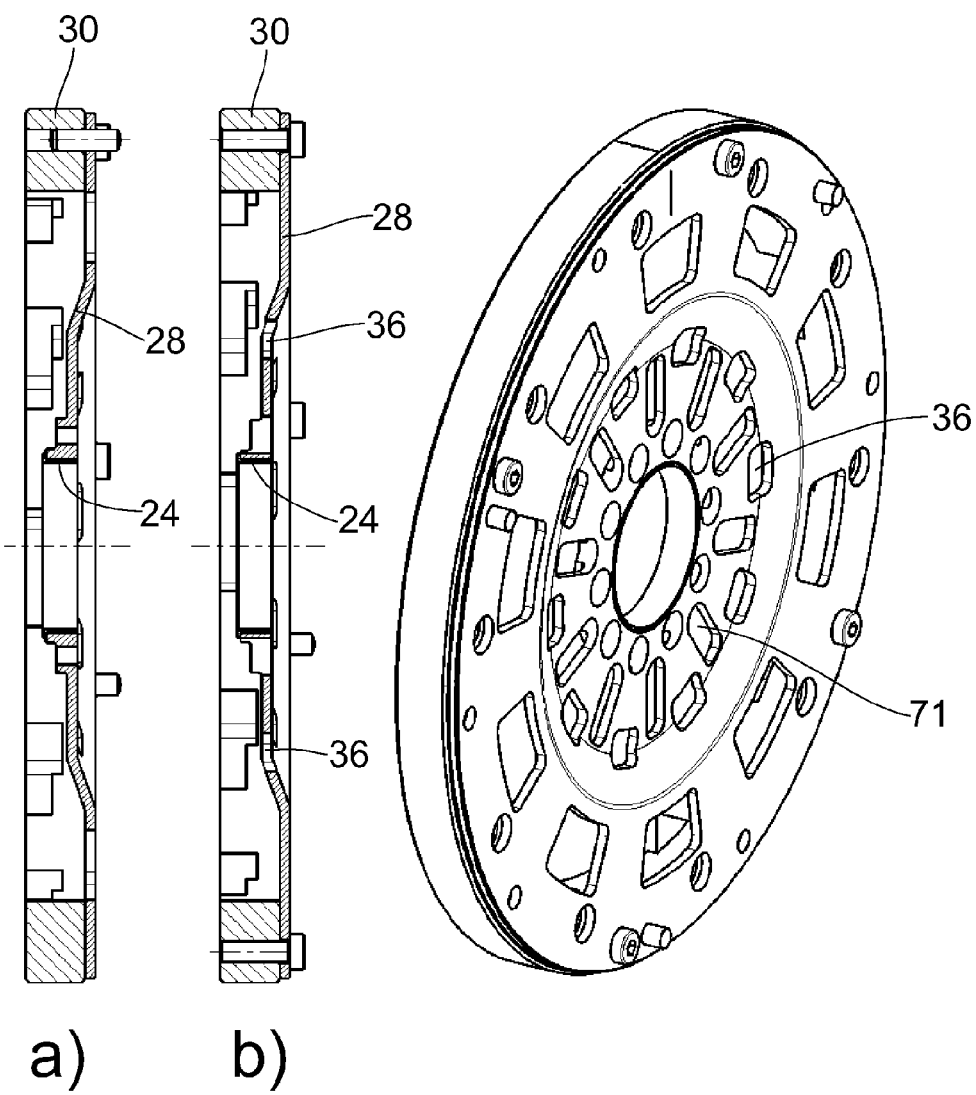
FIG. 6 is a perspective view of the annularly formed deflection mass.

FIGS. 1 to 3 show a torsional vibration damping arrangement, designated generally by 10, which can be integrated in or coupled with a drivetrain of a vehicle to perform the functionality of a speed-adaptive mass damper. The torsional vibration damping arrangement 10 comprises a carrier 12 which is to be fastened by screws to a drivetrain component for rotating therewith around an axis of rotation A. In the views shown in FIGS. 3 and 4, guides 14 are provided in this carrier 12 preferably approximately circumferentially equidistant at a plurality of circumferential positions, supporting elements 16 acting as flyweights being received in these guides 14 so as to be radially movable. The guides 14 are formed as substantially radially extending, elongated cutouts which are limited radially inwardly by stops 18 defining a radially inner base position of the supporting elements 16. The supporting elements 16 are held in contact with the stops 18 radially inwardly, i.e., so as to be preloaded into and in the base position, by preloading springs 20 formed as compression coil springs. To this end, the preloading springs 20 are supported at a radially outer annular edge region 22 of the carrier 12.

A carrier disk 28 is supported at the carrier 12 via a radial bearing 24 and an axial bearing 26 so as to be basically rotatable around the axis of rotation A with respect to the carrier 12. In its radially outer region, the carrier disk 28 carries a mass ring 30, for example, by screw connection at an axial side. A further mass ring 32 can be fastened to the other axial side, for example. Together with the mass ring 30 and possibly also mass ring 32, the carrier disk 28 forms a deflection mass, designated generally by 34. The carrier disk 28 and, therefore, the deflection mass 34 is axially secured to the carrier 12 by means of a plurality of bolts 40, also shown in FIG. 2, for example, threaded bolts, which pass through cutouts 36 elongated in circumferential direction and which hold an axial retaining ring 38 at the side of the carrier disk 28 remote of the carrier 12. Because of the circumferential movement play of the bolts 40 in the cutouts 36 of the carrier disk 28, the deflection mass 34 is rotatable around the axis of rotation A in corresponding circumferential movement play with respect to the carrier such that bolts 40 and cutouts 36 cooperate to limit relative rotational angle.

The deflection mass arrangement 34 is coupled with the carrier 12 for power transmission by means of a plurality of circumferentially successive, substantially radially extending restoring elements 42. These restoring elements 42 which are formed in this case, for example, as leaf springs or generally as bending beams are fastened in their radially outer area 44 to the mass ring 30 by a respective clamping arrangement 46. Proceeding from this fastening, they extend radially inward through openings 48 in the edge region 22 of the carrier 12 into a respective preloading spring 20.

As is illustrated in FIG. 7, the restoring element 42, or every restoring element 42, projects by its radially inner end region 50 into and through a central aperture 52 of an associated supporting element 16. In the region of aperture 52, for example at pins 54, 56, there are two circumferential supporting regions 58, 60 spaced apart laterally at the supporting element 16. These circumferential supporting regions 58, 60 located on both sides of the radially inner end region 50 of the associated restoring element 42 in circumferential direction define in their entirety a carrier supporting region 62, whereas a deflection mass supporting region 64 is formed in the region in which the radially outer end region 44 of the restoring element 42 is secured to the mass ring 32 or, generally, to the deflection mass 34.

As will be shown in the following, the restoring element 42 is received between the two circumferential supporting regions 58, 60 with movement play so as to allow a radial movement of the supporting element 16 in the associated guide 14 in the carrier 12 occurring due to centrifugal force. To prevent a tilting of the supporting element 16 during this radial movement, the supporting element 16 has at both axially oriented sides thereof guide projections 66, 68 which extend into, and are radially movably guided and received in, associated substantially radially extending guide cutouts 70, 71 of the carrier 12 and of the carrier disk 28, respectively. Cutouts 71 can have a greater circumferential width than the cutouts 70 in the carrier 12 so as not to impair the relative rotation of the carrier disk 28 with respect to the carrier 12 particularly by interaction of the guide projection 68 with the carrier disk 28. Further, a tilting of the supporting element 16 occurring due to centrifugal force is prevented in that the center of mass M of the supporting element 16 is approximately centrally located in the aperture 52.

In the torsional vibration damping arrangement 10 having the constructional design mentioned above with reference to FIGS. 1 to 11, a supporting element 16 which is radially movably guided in the carrier 12, the restoring element 42 cooperating with the latter, the preloading spring 20 which preloads the supporting element 16 radially inward into the base position thereof, shown in FIG. 7, and the deflection mass 34 respectively form a deflection mass pendulum unit 72. In the depicted embodiment, a total of ten such deflection mass pendulum units 72 are provided, wherein the carrier 12 is a shared carrier 12 for the supporting elements 16 of all of the deflection mass pendulum units 72, and the deflection mass 34 is a shared deflection mass 34 for all of the deflection mass pendulum units 72. However, the principles of the present invention could basically also be realized when a separate and independent carrier is provided in association with each deflection mass pendulum unit 72 or at least with a portion of the deflection mass pendulum units 72 and/or when an independent deflection mass is provided in association with all of the deflection mass pendulum units 72 or with some of the deflection mass pendulum units 72. However, for reasons of stability and to prevent unwanted vibration states or to obtain a synchronous vibration behavior of all of the deflection mass pendulum units 72, it is advantageous at least to combine all of the deflection masses in a common annular deflection mass 34.

Figure 12:
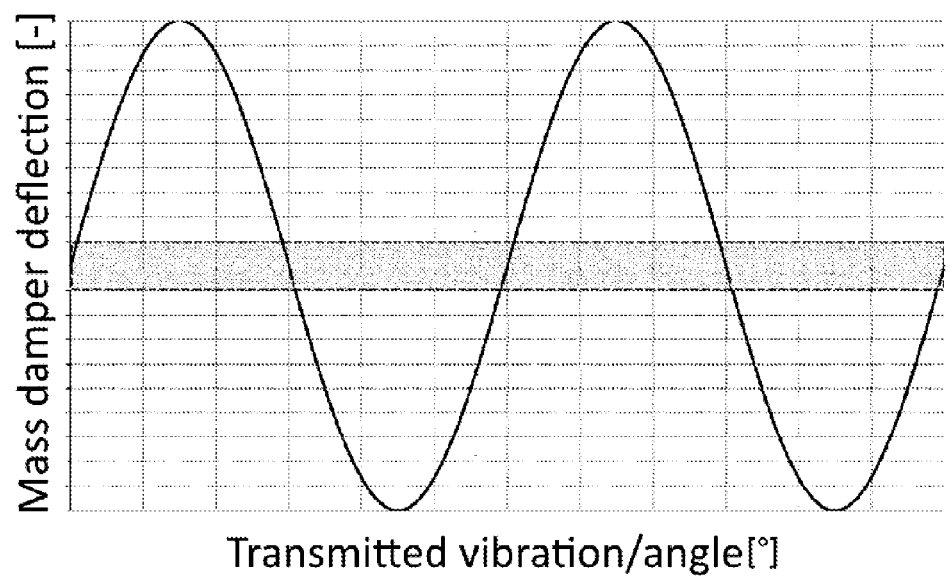
FIG. 12 is a graph of the periodic deflection of a deflection mass of the torsional vibration damping arrangement with restoring elements supported on both sides.

FIG. 12 shows the periodic vibration behavior of the deflection mass 34, designated generally in FIG. 12 as mass damper deflection, plotted over time or over a transmitted vibration. A gray-shaded deflection region is shown in the zero crossover area. This is the region obtained by reason of the restoring elements 42 being received with play between the associated circumferential supporting regions 58, 60. During periodic deflection of the deflection mass 34 and corresponding back-and-forth deformation of the restoring elements 42, a condition in which there is no force transmission between the carrier 12 and the deflection mass 34 always occurs for a short time at the zero crossover, i.e., in the basic relative position between carrier 12 and deflection mass 34 in which the restoring elements 42 are not compressed, due to the radial inner end region 50 of the restoring elements 42 being received with play between the circumferential supporting regions 58, 60. In this condition, the restoring elements 42 do not load the associated supporting elements 16 in circumferential direction so that there can occur a radial displacement of the supporting elements 16 which is largely unencumbered by loads of this type and by frictional effects brought about by these loads. This displaceability of the supporting elements 16 which is unimpaired as far as possible by frictional effects can also be additionally supported in principle in that the torsional vibration damping arrangement 10 is received in a housing which is filled or fillable with fluid, e.g., oil. As a result of this, the supporting elements 16 undergo a lubricating effect with respect to the carrier 12 and also with respect to the associated restoring elements 42 and can therefore be displaced more easily under centrifugal load.

Figure 13:
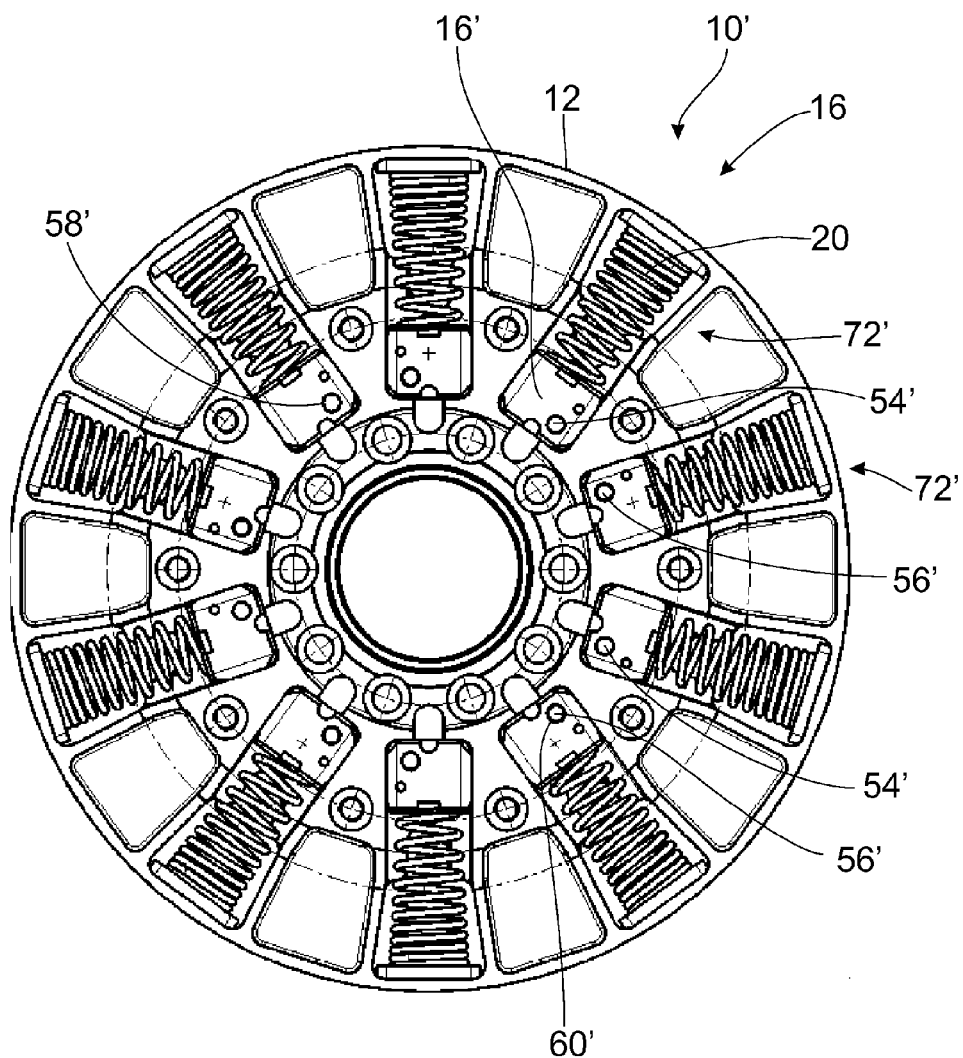
FIG. 13 is a view corresponding to FIG. 3 of a mode of construction modified particularly in the region of the supporting elements.
Figure 14:
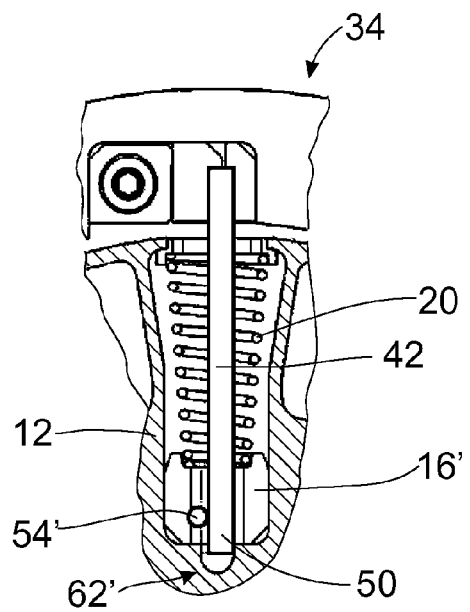
FIG. 14 is a view of an enlarged detail view of a deflection mass pendulum unit of the torsional vibration damping arrangement of FIG. 13.
Figure 15:
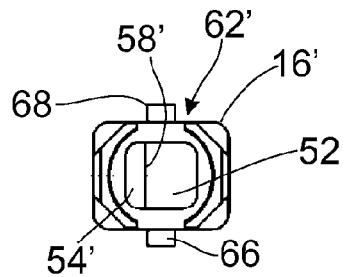
FIG. 15 is a supporting element of the deflection mass pendulum unit of FIG. 14 viewed from the radially outer side.
Figure 16:
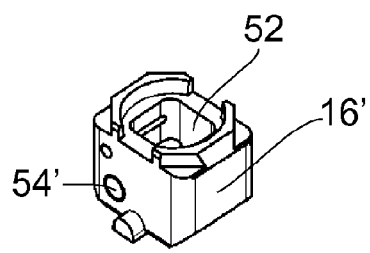
FIG. 16 is a perspective view of the supporting element of FIG. 15.
Figure 17:
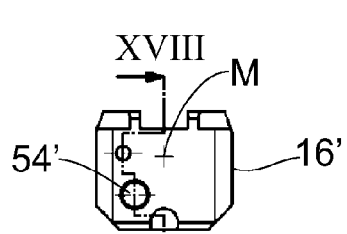
FIG. 17 is a side view of the supporting element of FIG. 15.
Figure 18:
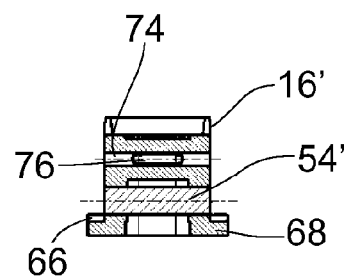
FIG. 18 is a view of the supporting element of FIG. 15 in section along a line XVIII-XVIII in FIG. 17.

An embodiment which is modified particularly with respect to the construction of the supporting elements 16 is shown in FIGS. 13 to 19 and is described with reference to these figures. The basic construction corresponds to the preceding description so that reference may be had to the relevant statements made above. It can be seen particularly from FIGS. 14 to 18 that only one pin 54' or 56' is provided in the supporting elements 16' shown here and, accordingly, there is also only one circumferential supporting region 58', 60' provided at the carrier supporting region 62'. Accordingly, the restoring element 42 can be supported in the carrier supporting region 62' in only one circumferential direction. As is shown in FIG. 13, the overall construction is such that alternately a pin 54' is provided one time in the circumferentially successive deflection mass pendulum units 72' for providing a circumferential support in one circumferential direction, and a pin 56' is provided one time in the subsequent deflection mass pendulum unit 72' to realize a circumferential supporting function in the other circumferential direction. As a result, only half of the restoring elements 42 of all of the deflection mass pendulum units 72 is operative during each half-oscillation, which halves the total stiffness of the torsional vibration damping arrangement 10.

It should be noted that, of course, the circumferential sequence of different deflection mass pendulum units 72' need not alternate in the manner depicted in FIG. 13. A plurality of deflection mass pendulum units 72' of basically identical construction, i.e., with supporting functionality in the same circumferential direction, could also be arranged successively in each instance. However, for reasons of symmetry and to prevent imbalances, the alternating arrangement shown in FIG. 13 is particularly advantageous.

The center of mass M is advantageously centrally disposed in the aperture 52 in this case also so that a centrifugal force-induced tilting of the supporting elements 16' is also prevented in this embodiment form. To achieve this, one or more bore holes or openings 74 and possibly mass elements 76 inserted therein can be provided to compensate for the additional mass of a respective pin 54' or 56' in the supporting element 16'.

Figure 19:
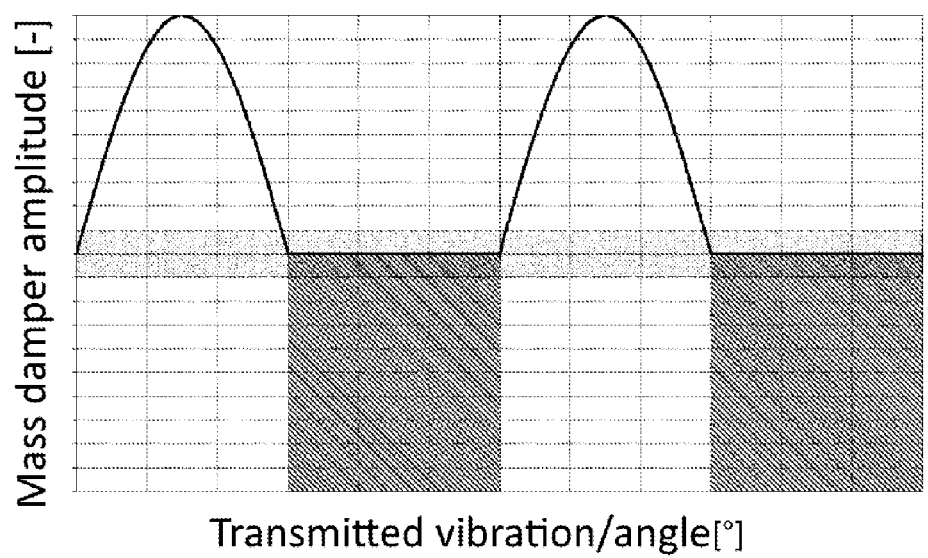
FIG. 19 is a graph of the periodic deflection of a deflection mass with restoring elements supported at one side.

The functioning of a deflection mass pendulum unit 72' constructed in this way is illustrated in FIG. 19. It will be seen that this deflection mass pendulum unit 72' is only operative during half-oscillations for generating a restoring force. Through the cooperation of a plurality of differently configured deflection mass pendulum units 72', a restoring force functionality can be achieved over the entire course of the oscillation. Here also, a gray-filled region is shown close to the zero crossover in FIG. 19. In principle, any pin or circumferential supporting region in the zero crossover could also have a shorter circumferential distance from the associated restoring element 42 in this case. However, clearance of this kind could also be dispensed with in view of the fact that the radially inner end region 50 of the restoring element 42 lifts off from the individual circumferential supporting region whenever a restoring element 42 is in a nonoperative oscillation phase with respect to the deflection mass pendulum unit 72'.

FIGS. 20 and 21 show different constructional variants of the restoring element 42. FIGS. 20*a*) to 20*d*) show different geometrical qualities which a restoring element 42 formed as a leaf spring or generally as a bending beam can have. In these views, the radially outer end region 44 is on the left-hand side, while the radially inner end region 50 is on the right-hand side. FIG. 20*a*), for example, shows a substantially cuboidal shape of the restoring element 42 having a constant width along the radial length thereof. In FIG. 20*b*) a triangular flexible spring narrows radially inward in an arrow-like or pointed manner, while a trapezoidal flexible spring ends in a truncated manner in FIG. 20*c*). In FIG. 20*d*) the restoring element 42 narrows in direction of the radially inner end region 50 so as to be curved on one side.

FIGS. 21*a*) and 21*b*) show a leaf spring-like restoring element 42 which basically has the construction shown in FIG. 20*a*). However, chamfers 78, 80 are provided in the vicinity of the radially inner end region 50 in the area of two edges adjoining a broad side. Particularly with the modification shown in FIG. 14, these chamfers 78, 80 can prevent the restoring element 42 from coming in contact with the radially inner end region of the preloading spring 20 or of the coils positioned there.

Further, FIG. 21*b*) shows the free length L of a restoring element 42 between the radially outer deflection mass supporting region 64 thereof and the carrier supporting region 62 which is located farther radially inward, where a reaction force F is introduced through support at the respective associated supporting element 16. This free length L essentially defines the bending stiffness and, therefore, the spring constant of a respective restoring element 42 and will play an important part in the configuration of a respective deflection mass pendulum unit 72 and torsional vibration damping arrangement 10 which will be described in more detail hereinafter.

FIG. 22 shows a side view of a preloading spring 20 which is constructed as a compression coil spring and can be used in the torsional vibration damping arrangement 10 described above. It will be seen in FIG. 22 that the preloading spring 20 has a shape which basically narrows in diameter, for example in a frustum shape or conical shape, from its radially outer end region 82 which is supported, or is to be supported, at the carrier 12 or edge area 22 thereof to the radially inner end region 84 which is supported at the supporting element 16. The pitch of the individual coils can also vary, this variation being effected in the present example such that the pitch G of the coils increases between the radially outer end region 82 and the radially inner end region 84. The thickness of the spring wire used to produce a preloading spring 20 of this kind could also vary, for example, between the radially outer end region 82 and the radially inner end region 84. By configuring the preloading spring 20 in this way, it is ensured that the preloading spring 20 has a characteristic which deviates from a linear force-deflection characteristic generally found in compression coil springs and which has a progressive stiffness, i.e., a spring constant that increases as compression increases, as will be explained in more detail later.

Figure 23:
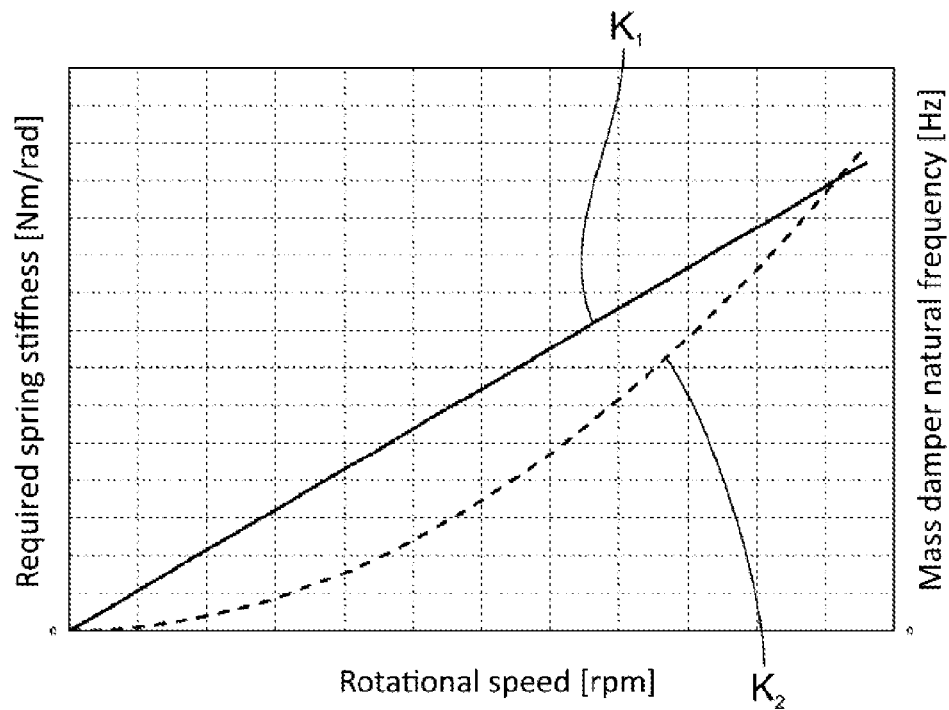
FIG. 23 is a graph, plotted over the rotational speed, of a natural frequency of a torsional vibration damping arrangement varying substantially linearly with the rotational speed and, relative to the latter, a stiffness varying parabolically over the rotational speed.

The torsional vibration damping arrangement 10 which was described in detail above as regards its constructional layout operates in principle as a speed-adaptive mass damper. This means that the natural frequency of this vibrational system shifts together with the frequency of an excitation order in order to keep the natural frequency tuned to the frequency of an excitation order which varies depending on speed. This is illustrated in FIG. 23 by the natural frequency, illustrated by the solid line $K_1$, which varies linearly over speed and is designated in this figure as mass damper natural frequency. The natural frequency of a vibrational system of this type is generally defined by the square root of the ratio of spring stiffness to mass. This means that in order to obtain a natural frequency which varies linearly over rotational speed (curve $K_1$), a parabolic or quadratic increase in spring stiffness or spring constant over rotational speed is required as is illustrated in FIG. 23 by curve $K_2$.

The aim in the design of a vibrational system of this type is to achieve the variation in stiffness illustrated by curve $K_2$ in FIG. 23 and the resulting linear variation in the natural frequency in a speed-dependent manner.

Figure 24:
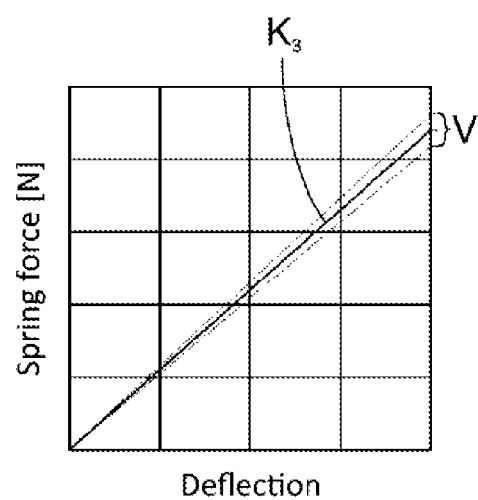
FIG. 24 is a graph showing the force-deflection characteristic of a restoring element formed as leaf spring or bending beam.

The basis of the design of the torsional vibration damping arrangement 10 and of the individual deflection mass pendulum units 72 consists in that the restoring elements 42 generating a restoring force into the basic relative position of the deflection mass 34 have a substantially linear force-deflection characteristic as is illustrated by the curve or straight line $K_3$ in FIG. 24. Certain deviations can occur here within a range of variation V. In particular for the range of small deflections, restoring elements 42 formed, for example, as leaf springs or generally as bending beams have a substantially linear characteristic $K_3$ for a given free length L between the two supporting regions 64, 62.

FIG. 25 shows once again the aimed-for parabolic variation of the stiffness or spring constant of the individual restoring elements 42 and the total stiffness of all of the restoring elements 42 in curve $K_2$ plotted over rotational speed. It should be noted here that the unit selected for the stiffness or spring constant is Nm/rad due to the fact that in the vibrational systems under consideration here there are basically rotational movements and an angular deflection from the basic relative position is to be generated.

Accordingly, in order to achieve the parabolic or quadratic increase of curve $K_2$ it is necessary for different speeds to provide correspondingly different force-deflection characteristics of the restoring elements 42 such as are shown in FIG. 24. This is illustrated in FIG. 25 by the force-deflection characteristics $K_3$ of the restoring elements 42, or of all of the restoring elements 42, which are to be achieved for various speeds from 1000 rpm to 4000 rpm.

Figure 26:
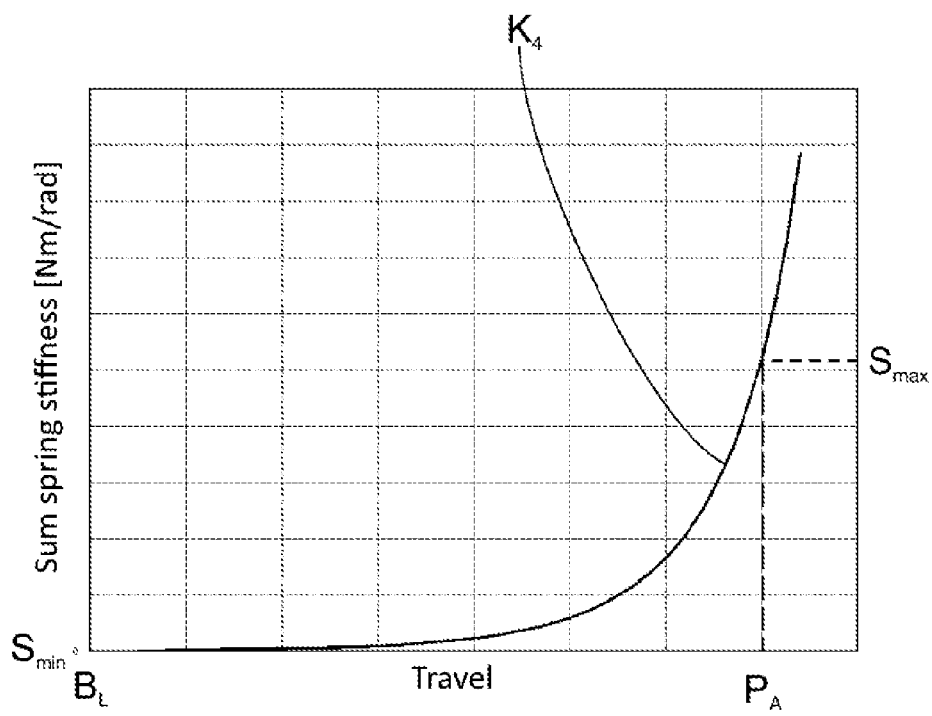
FIG. 26 is a graph showing a stiffness of restoring elements occurring as a function of the radial positioning of supporting elements.

FIG. 26 illustrates the variation in the spring stiffness or spring constant of the restoring elements 42 as a function of the radial positioning of the supporting elements 16. The farther the supporting elements 16 are shifted radially outward starting from the base position $B_L$ thereof, as is illustrated, for example, in FIG. 7, the shorter the free length L of the restoring elements 42 and the stiffer the individual restoring elements 42 or entirety of restoring elements 42. This means that qualitatively the curve $K_4$ shown in FIG. 26 represents the curve of the stiffness or spring constant of all of the restoring elements 42 in their entirety resulting as a function of the radial positioning, i.e., the travel, of the supporting elements 16 as well as the corresponding curve for an individual restoring element 42. FIG. 26 further shows that there is a progressive increase, i.e., an increase with rising gradient, over the travel starting from a minimum stiffness $S_{min}$ in the base position $B_L$ to a maximum-capacity stiffness $S_{MAX}$ when a radially outward stop positioning $P_A$ is reached. This stop position can be achieved or can be predefined, for example, in that the guide projections 66, 68 come in contact at the supporting elements 16 with the radially outer end regions of the associated cutouts 70, 71 in the carrier 12, or in the carrier disk 28, and further radial displacement of the supporting elements 16 is not permitted.

Figure 25:
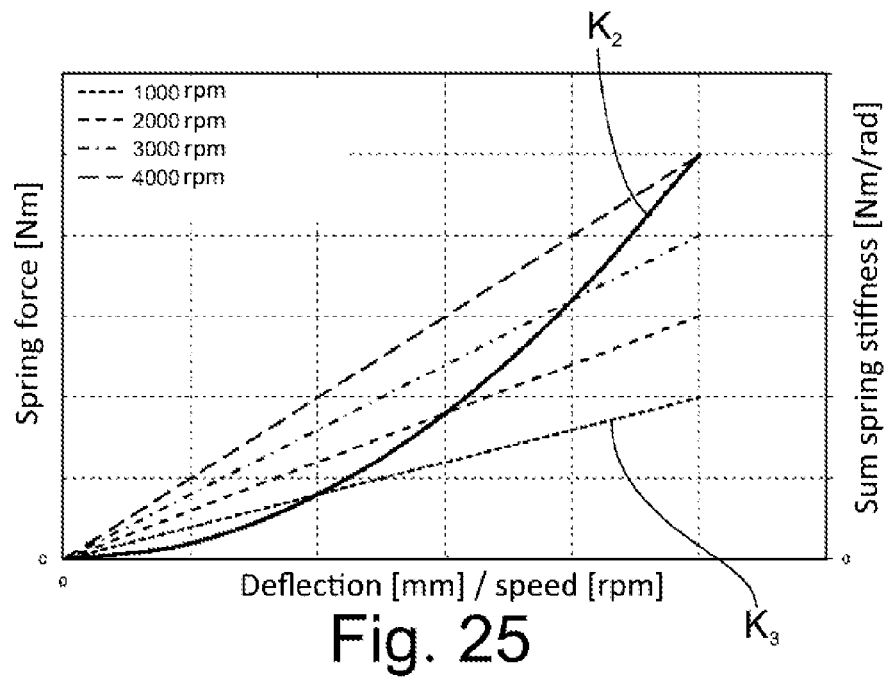
FIG. 25 is a graph showing a stiffness varying parabolically over rotational speed which is achieved through linear deflection-force characteristics of restoring elements associated with different rotational speeds.
Figure 27:
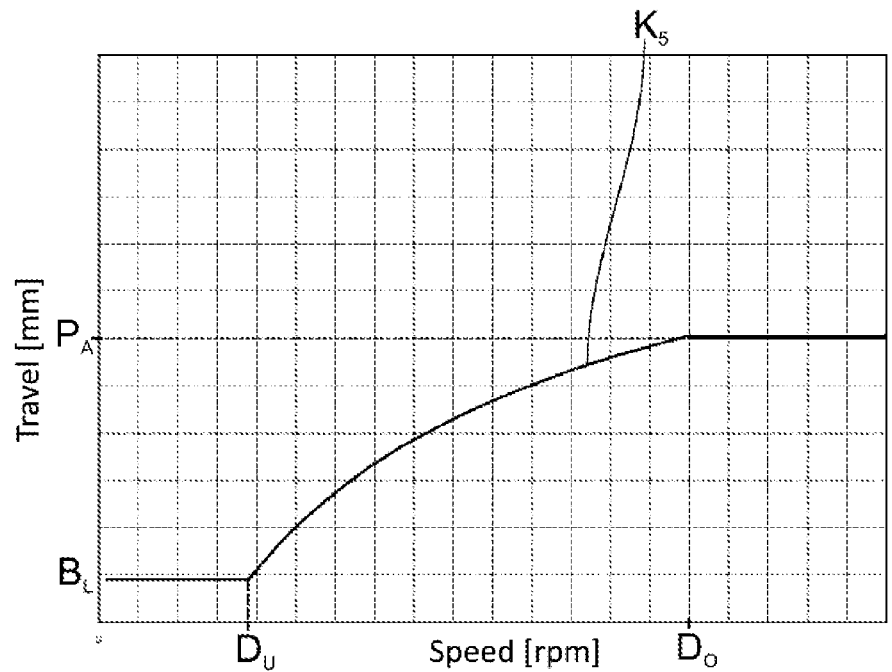
FIG. 27 is a graph showing a radial positioning of supporting elements which occurs or will occur as a function of rotational speed with degressively varying radial positioning.

Based on this progressive variation of the spring constant or stiffness of the individual restoring elements 42, or of all restoring elements 42, resulting as a function of travel, i.e., radial positioning, it is necessary to achieve a degressively increasing travel of the individual supporting elements 16, as illustrated by curve $K_5$ in FIG. 27, resulting as a function of the rotational speed in order that the required parabolic variation of the stiffness over rotational speed, as illustrated for example in FIG. 25 by curve $K_2$, is finally achieved superimposed on the stiffness represented in curve $K_4$ resulting as a function of the travel. It will be seen from FIG. 27 that starting from a speed of 0 the supporting elements 16 initially remain in their base position $B_L$ until a lower limiting speed $D_U$ is reached. This is achieved through the preloaded installation of the preloading springs 20 and ensures that no unwanted or undefined displacements can take place at comparatively lower rotational speeds. A radial displacement of the supporting elements 16 radially outward with the degressive increase represented by curve $K_5$ will then take place only after the lower limiting speed $D_U$ has been exceeded, which ultimately means that at lower speeds a predetermined increase in speed leads to a greater radial displacement than at higher speeds. When the upper limiting speed $D_O$ is reached, the supporting elements 16 reach their stop position $P_A$ so that further radial displacement will not occur.

Figure 28:
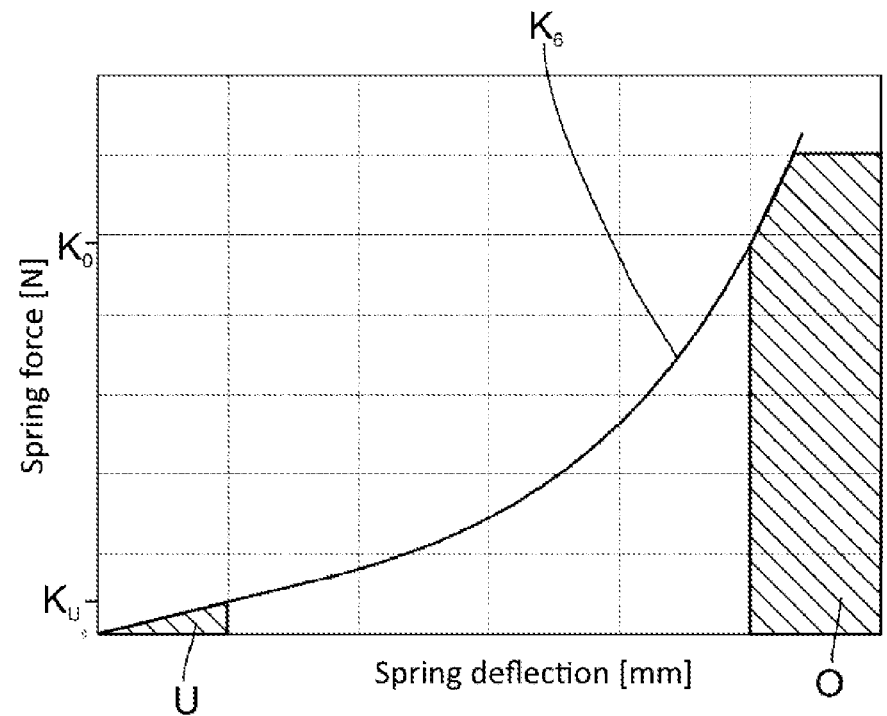
FIG. 28 is a graph showing a force-deflection characteristic of a preloading spring according to FIG. 22.

In order to achieve this degressive curve $K_5$ of the radial positioning, illustrated in FIG. 27, which takes place in a speed-dependent manner, the preloading springs 20 which load the supporting elements 16 radially inward in direction of the base position $B_L$ thereof are designed in principle with the progressive curve of the force-deflection characteristic thereof illustrated by curve $K_6$ in FIG. 28. Here also, a substantially parabolic curve is selected. Owing to the limiting of the radially outward radial displacement of the supporting elements 16 when reaching the stop position $P_A$, an upper range O of the characteristic, shown as shaded, is also not used. Ultimately, the range between a lower limiting force $K_U$ corresponding to the preloading force in the basic position $B_L$ and an upper limiting force $K_O$ is used between the base position $B_L$ and the stop position $P_A$.

As a result of this type of progressive increase in spring force over spring deflection, with increasing displacement of the supporting elements 16 radially outward, a progressively increasing counterforce by the preloading springs 20 opposes a further displacement, which basically achieves the degressive curve $K_5$ shown in FIG. 27 representing the radial positioning with increasing speed, i.e., with increasing displacement of the supporting elements 16 radially outward and thus with increasing compression of the preloading springs 20.

Figure 29:
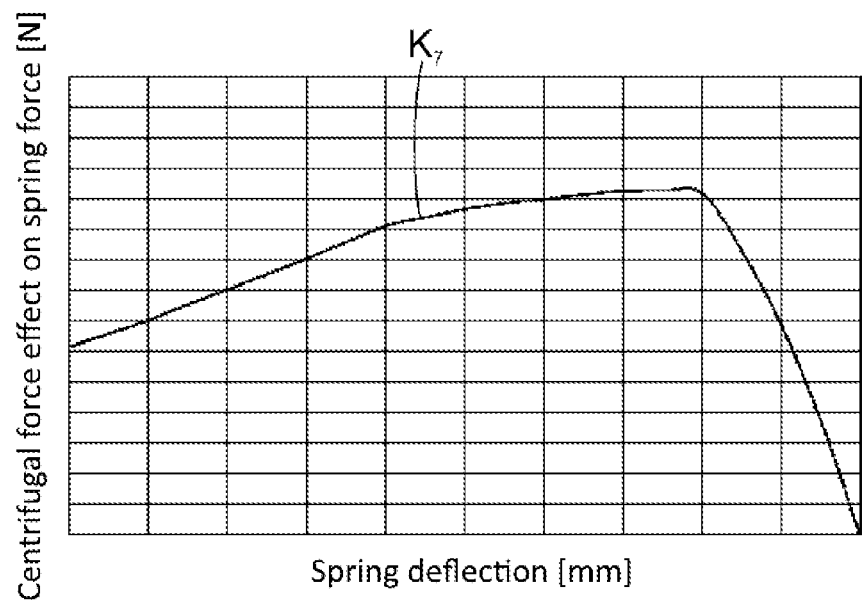
FIG. 29 shows the centrifugal force effect varying over spring deflection and, therefore, as a function of rotational speed on the characteristic curve of FIG. 28.

Due to the fact that the supporting elements 16 are subject not only to centrifugal force but also to other factors influencing the radial displacement thereof, various other aspects must be taken into account in the design of the preloading springs 20. Accordingly, the preloading springs 20 which are oriented radially with their compression direction are themselves subject to an influence by centrifugal force. This centrifugal force influence reduces the radially inwardly directed spring force supplied by the preloading springs 20 in the sense illustrated in FIG. 29. Here, the centrifugal force influence on the spring force supplied by springs 20 is plotted over spring deflection, i.e., over compression, in curve $K_7$, wherein an increasing spring deflection represents an increasing displacement of the supporting elements 16 radially outward and, therefore, of course, also an increasing speed. It will be seen that the centrifugal force influence increases as compression increases and, therefore, also as the speed increases, which ultimately occurs because the centrifugal force increases quadratically with the speed, and those areas of the preloading springs 20 which are still subject to a centrifugal force effect decrease with increasing compression. Due to the compression of the preloading springs 20, more and more coils are stacked against one another beginning from the radially outer end regions 82 thereof so that the quantity and, therefore, the mass of the coils not yet compressed that is subject to centrifugal force decreases and, therefore, in spite of the centrifugal force rising quadratically with the speed, the influence of the centrifugal force on the spring force of the preloading springs 20 can become less noticeable and finally decreases again.

Accordingly, this centrifugal force effect must always be taken into account in the design of the preloading springs 20 to obtain a required resulting force-deflection characteristic.

Figure 30:
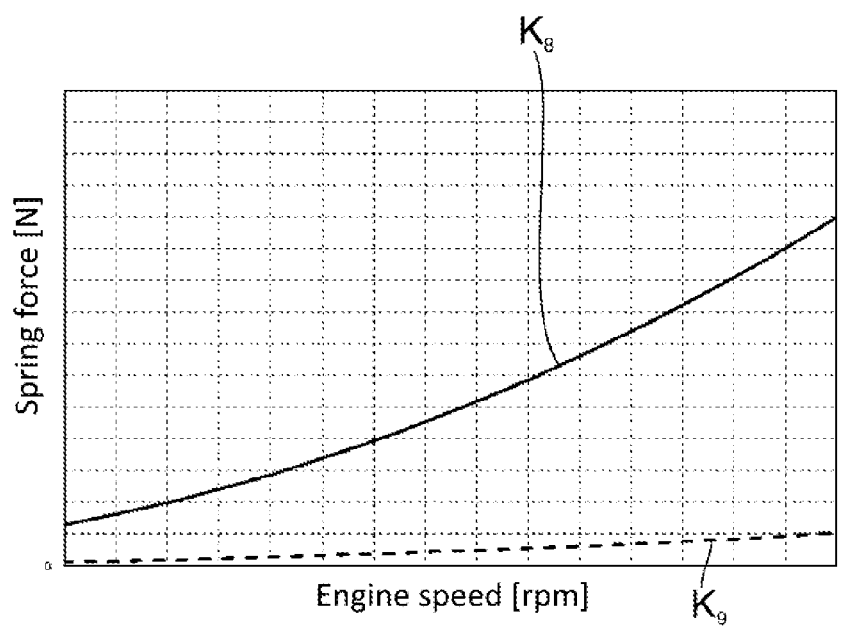
FIG. 30 shows the speed-dependent centrifugal force effect and fluid pressure effect on a supporting element.

Of course, the fact that the centrifugal force which acts on the supporting elements 16 acting as flyweights increases quadratically with rotational speed, which fact is represented by curve $K_8$ in FIG. 30, has a further influence on the preloading force which is to be provided by the preloading springs 20 and which acts radially inward. However, not only the supporting elements 16, but also the fluid present in the aforementioned housing is subject to centrifugal force. Here a pressure gradient building up in the fluid as a result of centrifugal force occurs from the radially inner side to the radially outer side owing to the fact that as the radial distance from the axis of rotation A increases, the centrifugal force also increases. For example, if the supporting elements 16 are completely surrounded in every position by fluid collecting radially outwardly due to centrifugal force, the fluid pressure acting on the surface regions which are oriented radially outward is greater than that acting on the surface regions which are oriented radially inward and which, therefore, are also situated farther radially inward. This pressure difference ultimately leads to a force which reinforces the preloading springs 20, i.e., which basically acts on the supporting elements 16 in radially inward direction, and which increases with the speed as is illustrated by curve $K_9$ in FIG. 30. It is noted here that referring particularly to the force generated by a pressure differential, only the qualitative curve, i.e., the amount of force, is shown in FIG. 30. Since this force is directed radially inward, it basically acts counter to the centrifugal force effect—illustrated in curve $K_8$—on the supporting elements 16, i.e., is negatively signed.

Figure 31:
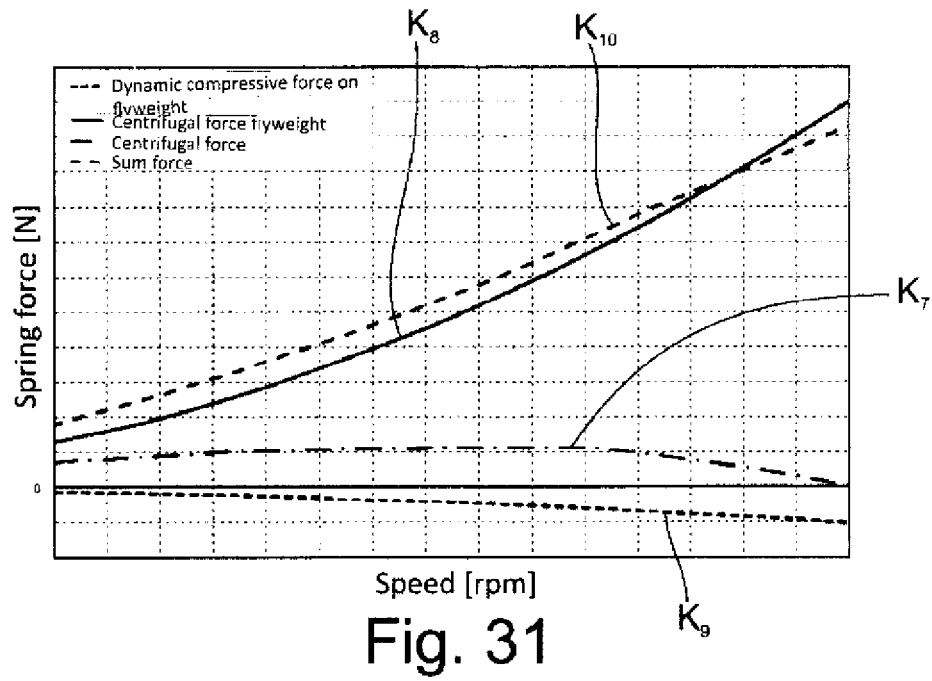
FIG. 31 shows by way of summary, the variables influencing the restoring characteristic of a preloading spring plotted over the rotational speed.

When the influencing factors described above with reference to FIGS. 29 and 30 are viewed in conjunction, the result for a preloading spring 20 with a basically progressive increase in the spring characteristic thereof as illustrated by curve $K_6$ in FIG. 28 is a spring force plotted over rotational speed as illustrated by curve $K_{10}$ in FIG. 31. FIG. 31 also shows the various influencing factors, discussed above referring to curves $K_7$, $K_8$ and $K_9$, which are to be superimposed on characteristic curve $K_6$ and which oppose or reinforce this characteristic curve $K_6$. Accordingly, the preloading springs 20 with their respective characteristics $K_6$ are to be designed such that, taking into account the influencing variables described above, the resulting curve of the spring force over engine speed as represented by curve $K_{10}$ ultimately results in the degressively increasing curve $K_5$—shown in FIG. 27—of the radial positioning of the supporting elements 16. In connection with the stiffness or spring constant varying according to curve $K_4$ in FIG. 26 as a function of this radial positioning and travel, this degressively increasing curve results again in a progressively increasing curve, particularly parabolically increasing curve, of the stiffness of the vibrational system as a function of rotational speed as is illustrated, for example, by curve $K_2$ in FIGS. 24 and 25. This progressive parabolic curve $K_2$ in turn results in a linear increase in the natural frequency over rotational speed and accordingly ensures that the tuning to an excitation order can be retained. The speed range between limiting speeds $D_U$ and $D_O$ that can be used or that is available for variation can be selected or limited depending on the design of the system. The configuration of the various influencing factors such as, e.g., the design of the preloading springs 20 for obtaining the characteristics $K_6$ thereof or the shape of the supporting elements 16 for generating a desired pressure differential between the radially outer and radially inner surfaces or the construction of the restoring elements 42 with the substantially linear force-deflection characteristics thereof can be tuned to one another, for example experimentally or in cover models, to arrive finally at stiffness curve $K_2$ and, therefore, at the natural frequency curve $K_1$ through superposition of the various influencing factors or characteristics.

Figure 32:
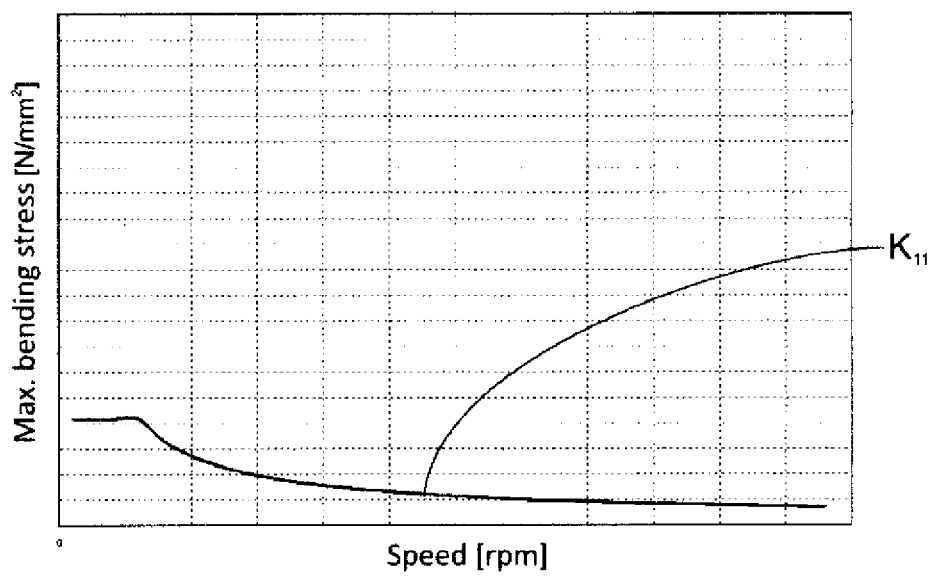
FIG. 32 is a graph illustrating the maximum bending load occurring in a restoring element plotted over rotational speed.

In FIG. 32, the maximum bending stress occurring in the region of the restoring elements 42, i.e., the maximum deflection occurring when a vibrational movement is carried out, is illustrated by a curve $K_{11}$ plotted over rotational speed. It will be seen that a deflection which is large enough that the rotational angle limiting provided through the cooperation between bolts 40 and cutouts 36 takes effect is generated only at lower rotational speeds. With increasing rotational speed however the oscillation amplitude of the deflection mass 34 and, therefore, the deformation and the bending stress generated in the restoring elements 42 decreases so that it is ensured at higher rotational speeds that a detuning of the vibrational system which is possibly brought about by the actuation of the rotational movement stop cannot occur.

Various possible uses of the torsional vibration damping arrangement 10 described above will be discussed in the following referring to FIGS. 33 to 37.

Figure 33:
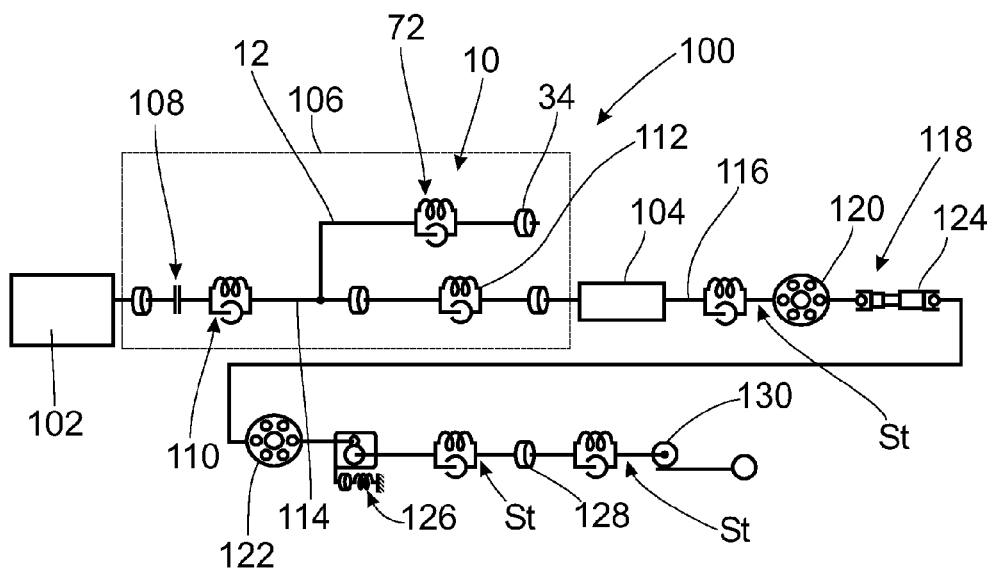
FIG. 33 is a schematic depiction of a drivetrain for a vehicle with a torsional vibration damping arrangement constructed according to the invention.

In FIG. 33, a drivetrain 100 comprises a drive unit 102 formed, for example, as an internal combustion engine. In the torque path between the drive unit 102 and a transmission 104, for example an automatic transmission, a torsional vibration damping arrangement 10 which is constructed in the manner described above is arranged in a rotating wet space 106 of a starting element, designated generally by 108. This torsional vibration damping arrangement 10 has the stiffness provided by the deflection mass pendulum units 72 with the deflection masses 34 and is coupled by carrier 12 to a rotating component of the drivetrain 100. Two torsional vibration dampers 110, 112 acting in series can be provided in the rotating wet space 106, each torsional vibration dampers 110, 112 having a primary side and a secondary side and damper springs which are operative therebetween and via which the torque transmitted between the drive unit 102 and the transmission 104 is conducted. In the depicted embodiment example, a secondary side of torsional vibration damper 110 is coupled with a primary side of torsional vibration damper 112 to provide an intermediate mass 114 to which the carrier 12 is connected. Downstream of the transmission 104 and transmission output shaft 116 in the torque path is a propeller shaft arrangement, designated generally by 118, with respective joint disks 120, 122 and a propeller shaft 124 located therebetween. On the output side, the propeller shaft 124 is coupled to an axle gear or differential 126. The torque is transmitted from the latter to rims 128 and tires 130. Respective stiffnesses St are shown in association with various transmission shafts, e.g., the transmission output shaft 116 of a transmission shaft between the differential and the rims 128 or rims 128 and tires 130, based on the inherent elasticity thereof.

Figure 34:
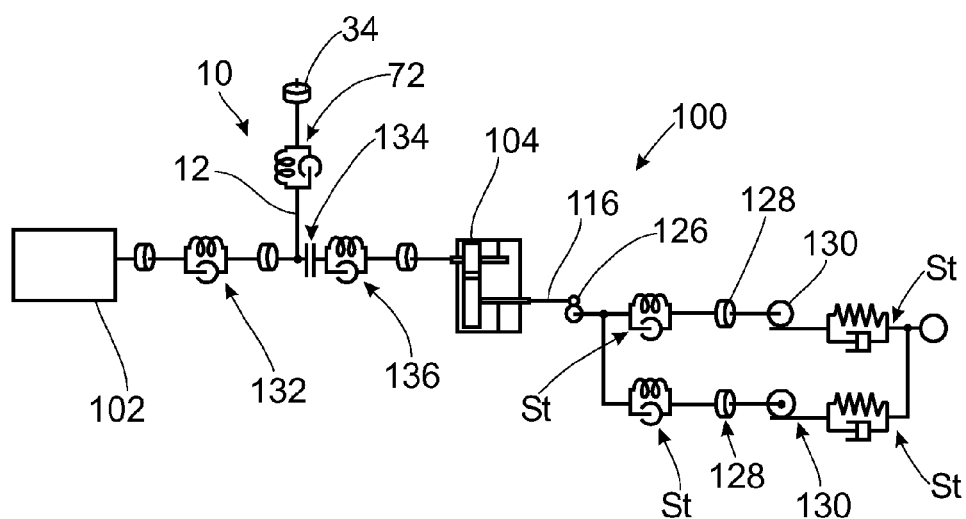
FIG. 34 is a view corresponding to FIG. 33 showing an alternative mode of construction.

While FIG. 33 shows a drivetrain 100 mounted longitudinally in driving direction, i.e., with longitudinally oriented drive unit 102 and longitudinally oriented transmission 104, FIG. 34 shows a drivetrain 100 with transversely mounted drive unit 102 and transmission 104. Located therebetween is a torsional vibration damper 132, for example, in the form of a dual-mass flywheel, the secondary side thereof being coupled with a friction clutch, for example a dry friction clutch 134. A clutch disk 136 which is likewise formed, for example, with a torsional vibration damper conveys the torque to the transmission 104 which is formed, for example, as a manual shift transmission.

The carrier 12 of the torsional vibration damping arrangement 10 is coupled to the secondary side of the torsional vibration damper or dual-mass flywheel 132.

Downstream of the transmission output shaft 116 on the output side is a differential 126 and the drive axle with its two rims 128 and tires 130. Here again, respective stiffnesses of the drive shafts and wheels are illustrated by St.

Figure 35:
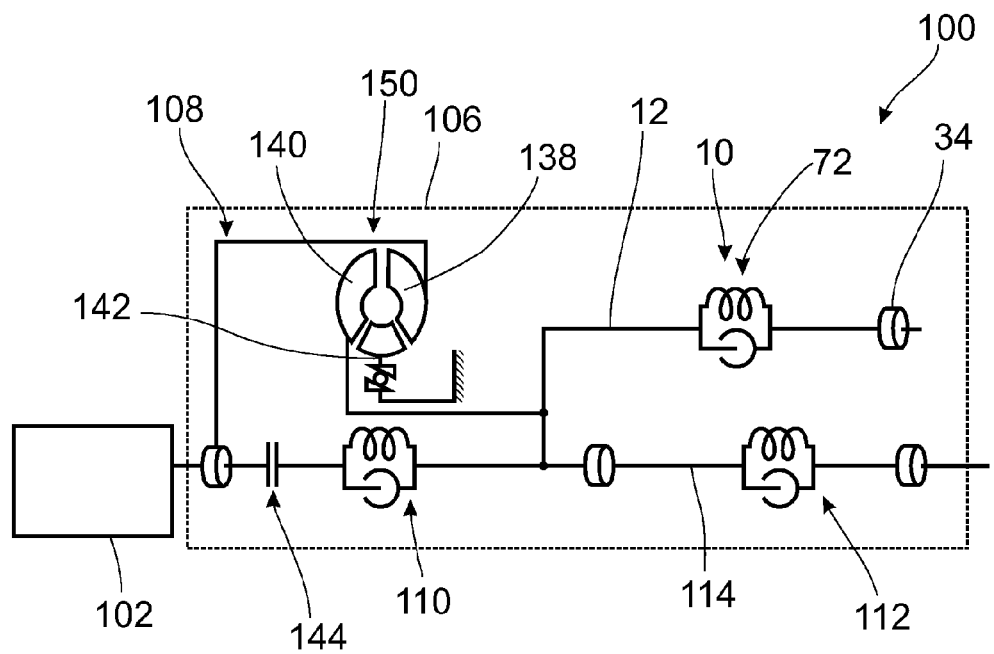
FIG. 35 is a view corresponding to FIG. 33 showing an alternative mode of construction.

FIG. 35 shows a further example of a portion of a drivetrain 100 with a hydrodynamic torque converter 150 as starting element 108 downstream of a drive unit 102. Provided in the housing or rotating wet space 106 thereof and rotating along with the latter is an impeller 138. A turbine 140 is provided axially opposed to the latter. A stator, designated generally by 142, is located between the impeller 138 and turbine 140. Parallel to the hydrodynamic torque transmission path which comprises the fluid circulation between the impeller, turbine and stator, a torque transmission path can be arranged via a lockup clutch 144. Downstream of the lockup clutch are the two torsional vibration dampers 110, 112, an intermediate mass 114 being formed therebetween. The turbine 140 and the carrier 12 of the torsional vibration damping arrangement 10 are coupled to this intermediate mass 114. It is noted here that the torsional vibration dampers which can also be seen, for example, in FIG. 35 can have a known construction with two cover disks and a central disk located therebetween. Either the two cover disks or the central disk is associated with the primary side, the other component then being associated with the secondary side. In each torsional vibration damper of this kind, one or more spring sets can operate in parallel or in series, possibly also in a stepped manner in order to achieve a correspondingly stepped damping characteristic.

Torsional vibrations or torsional irregularities transmitted into the input region of the hydrodynamic torque converter via the drive unit 102 can be reduced or damped initially in the torsional vibration damper 110 upstream in the torque path when the lockup clutch 144 is engaged or is transmitting torque. The torsional vibrations still being transmitted into the intermediate mass 114 can be further reduced or eliminated through the action of the torsional vibration damping arrangement 10 coupled therewith by corresponding configuration to an excitation order. A still further filtering or vibration damping can then be carried out through the further torsional vibration damper 112 downstream in the torque path.

It will be appreciated that different variations can be carried out in this respect. For example, the turbine 140 could be coupled directly to a transmission input shaft, i.e.,  the secondary side of the torsional vibration damper 112, which increases the mass inertia of a transmission input shaft. As a result, neither of the two torsional vibration dampers 110, 112 would be operative in the operative hydrodynamic range of the torque converter with lockup clutch 144 disengaged.

In a further variant, the turbine 140 could provide the deflection mass 34 or a part of the deflection mass 34. A merging of functions and, therefore, a compact constructional size can be ensured in this way. As a result of a configuration of this kind, the torsional vibration damping arrangement 10 is also utilized for torque transmission whenever the lockup clutch 144 is disengaged and a torque is to be transmitted via the turbine 140, and the configuration can then be such that the rotational angle limiting functionality of the bolts 40 and apertures 36 is operative in this condition, i.e., the restoring elements 42 are not loaded excessively. When the lockup clutch 144 is engaged, the turbine only operates as deflection mass 34 so that it also contributes to a viscous damping because of the fluidic interaction.

The lockup clutch 144 could also, of course, be located in the torque path between the two torsional vibration dampers 110, 112 or even downstream thereof, in which case it must be ensured that the turbine 140 is coupled to the lockup clutch 144 on the output side. Correspondingly, the carrier 12 of the torsional vibration damping arrangement 10 could also, of course, be coupled with the primary side of torsional vibration damper 110 or the secondary side of torsional vibration damper 112.

Figure 36:
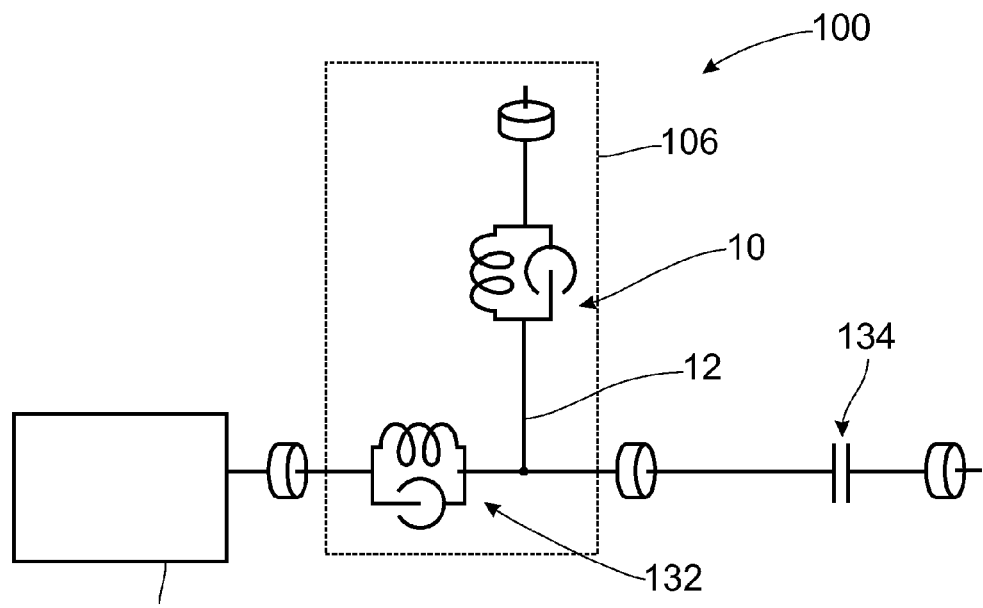
FIG. 36 is a view corresponding to FIG. 33 showing an alternative mode of construction.

FIG. 36 shows a constructional variant of a drivetrain 100 in which the drive unit 102 transmits its torque via a dual-mass flywheel 132 integrated, for example, in a rotating wet space 106. The torsional vibration damping arrangement 10 is connected by the carrier 12 thereof on the secondary side of the dual-mass flywheel 132. In this case, there is a downstream starting element, for example, a friction clutch 134, in the torque path.

Figure 37:
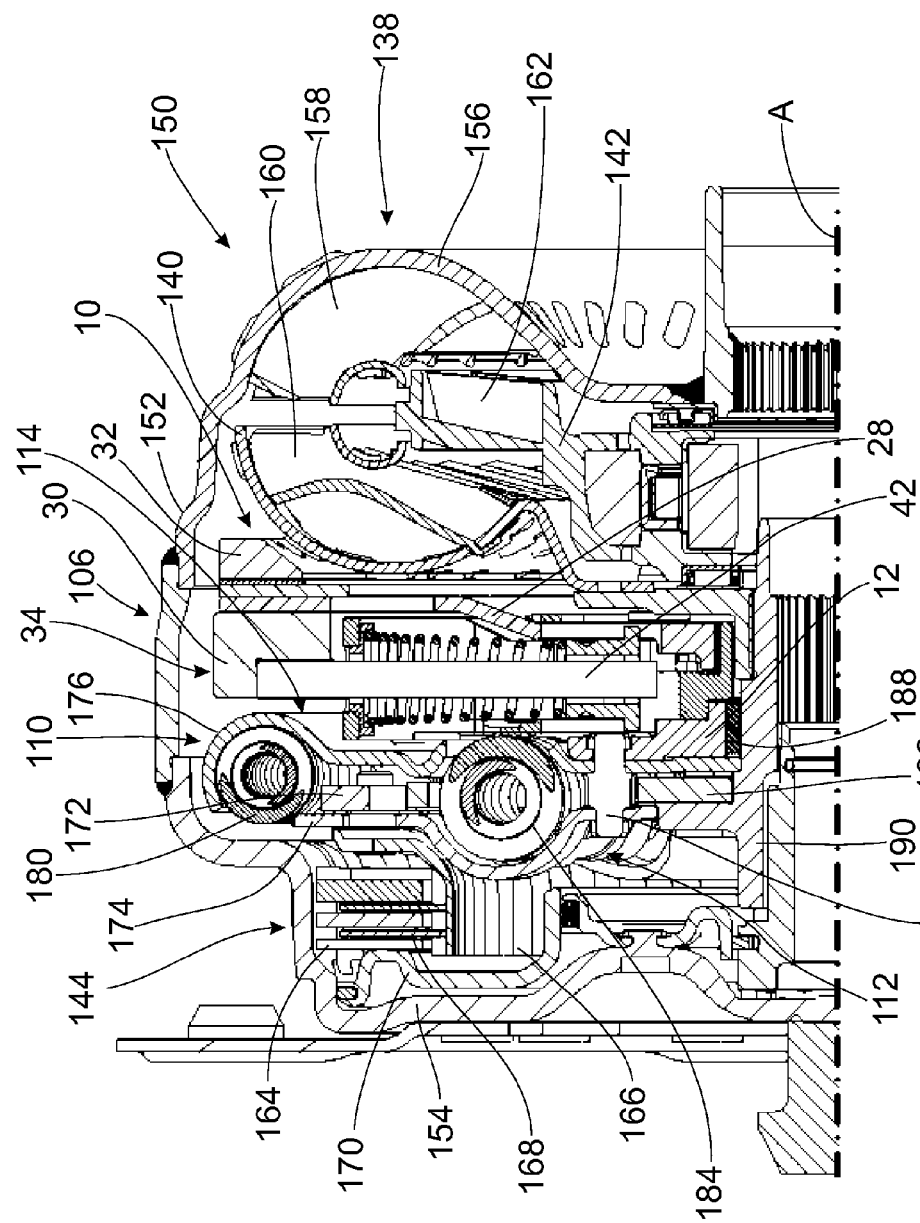
FIG. 37 is a fragmentary longitudinal sectional view showing a hydrodynamic torque converter with a torsional vibration damping arrangement constructed according to the present invention.

FIG. 37 shows a constructive layout of a hydrodynamic torque converter 150 in fragmentary longitudinal section. The housing 152 of the hydrodynamic torque converter 150 provides the rotating wet space 106 and comprises a drive-side housing shell 154 and an output-side housing shell 156 which also simultaneously forms an impeller shell and carries at its inner side a plurality of impeller blades 158 successively in circumferential direction around the axis of rotation A. The turbine 140 with turbine blades 160 is axially opposed to the impeller 138 provided in this way. The stator 142 with stator blades 162 is located between the impeller 138 and turbine 140.

The lockup clutch 144 comprises drive-side friction elements or plates 164 which are coupled to rotate with the drive-side housing shell 154 and output-side friction elements or plates 168 which are coupled to rotate with a friction element carrier 166. The latter can be pressed together by a clutch piston 170 for torque transmission and for engaging the lockup clutch 144. The torsional vibration damper 110 which is downstream of the lockup clutch 144 in the torque path and positioned here on the radially outer side comprises as primary side a central disk element 172 coupled with the friction element carrier 166. Located axially on both sides of the latter are cover disk elements 174, 176, the radially outer region of which essentially provides the secondary side of the torsional vibration damper 110. A torque is transmitted between the central disk element 172, i.e., the primary side, and the cover disk elements 174, 176, i.e., the secondary side, through damper springs 180 of the torsional vibration damper 110.

The radially inner areas of the cover disk elements 174, 176 form a secondary side of the second torsional vibration damper 112 which is positioned radially inwardly. A further central disk element 182 which essentially provides a secondary side of the further torsional vibration damper 112 is located axially between these cover disk elements which are fixedly connected to one another and is coupled with the cover disk elements 174, 176 through damper springs 184 for torque transmission.

The two cover disk elements 174, 176 also essentially provide the intermediate mass arrangement 114 to which the carrier 12 of a torsional vibration damping arrangement 10 constructed according to the invention is connected, for example, by means of bolts 186 which also fixedly connect the two cover disk elements 174, 176 to one another. The flywheel mass 34 of the torsional vibration damping arrangement 10 comprises the two mass rings 30, 32 and the carrier disk 28 and is located axially substantially between the two radially staggered torsional vibration dampers 110, 112 and the turbine 140. Owing to the shape of the mass ring 32 with radially inwardly angled contour, this mass ring 32 can be positioned so as to axially overlap the turbine 140, which allows an axially compact constructional size.

It will be seen that the carrier 12 is rotatably mounted on the radially inner side via a bearing 188, for example, a friction bearing or rolling element bearing, on an output hub 190 of the torsional vibration damping arrangement 10 connected to the central disk 182. The turbine 140 is also connected to this output hub 190, for example, by a toothed engagement, so as to rotate together with it such that the torque transmitted via the turbine is transmitted into the output hub 190 while circumventing the two torsional vibration dampers 110, 112 operating in series. Alternatively, as has already been stated, the turbine 140 can be coupled to the carrier 12 or, generally, the intermediate mass 114 or to the deflection mass 34 in order to increase the mass inertia thereof.

Whether or not the configuration mentioned with reference to FIGS. 23 to 31 for obtaining a required mass damper characteristic is selected, constructional configurations of the torsional vibration damping arrangement 10 described herein have independent inventive quality and therefore constitute an independent part of the invention described herein. Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damping arrangement, comprising:

at least one deflection mass pendulum unit (72; 72') having a carrier (12) which is rotatable around an axis of rotation (A);

a deflection mass (34) which can be deflected around the axis of rotation (A) in circumferential direction with respect to the carrier (12);

a deformable restoring element (42) having a spring stiffness and which is supported or supportable in a carrier supporting region (62; 62') with respect to the carrier (12) and in a deflection mass supporting region (64) with respect to the deflection mass (34), wherein a deflection of the deflection mass (34) in at least one direction from a basic relative position with respect to the carrier (12) causes a deformation of the restoring element (42);

a supporting element (16; 16') which is radially movably supported at the carrier (12) and provides the carrier supporting region (62; 62'), wherein a distance between the carrier supporting region (62; 62') and the deflection mass supporting region (64) can be varied through movement of the supporting element (16; 16') in the carrier (12), and the supporting element (16; 16') is preloaded in a direction of a radially inner base position ($B_L$) and is displaceable radially outward proceeding from the base position ($B_L$) against the preloading under centrifugal force action during rotation of the carrier (12) around the axis of rotation (A), the deflection mass pendulum unit being constructed so that at least one of a radial distance of the supporting element (16; 16') from the base position ($B_L$) increases degressively with increasing centrifugal force action at least in one rotational speed range and the spring stiffness of the restoring element (42) increases progressively at least in one rotational speed range through centrifugal force-induced displacement of the supporting element (16; 16').

2. The torsional vibration damping arrangement according to claim 1, wherein a relationship between rotational speed and the spring stiffness of the restoring element (42) has a parabolic shape.

3. The torsional vibration damping arrangement according to claim 2, wherein the restoring element (42) comprises one of a leaf spring and rod spring.

4. The torsional vibration damping arrangement according to claim 3, wherein the spring has a substantially linear force characteristic (K3).

5. The torsional vibration damping arrangement according to claim 1, wherein the restoring element (42) is fixed with respect to one of the deflection mass (34) and the carrier (12).

6. The torsional vibration damping arrangement according to claim 1, wherein the supporting element (16; 16') is acted upon in the base position ($B_L$) by the preloading force.

7. The torsional vibration damping arrangement according to claim 6, wherein the supporting elements (16; 16') of at least two of the deflection mass pendulum units (72; 72') are movably supported at a common carrier (12).

8. The torsional vibration damping arrangement according to claim 7, wherein at least one deflection mass (34) provides a common deflection mass (34) for at least two deflection mass pendulum units (72; 72').

9. The torsional vibration damping arrangement according to claim 8, wherein the common deflection mass (34) comprises a deflection mass ring (30, 32, 28).

10. The torsional vibration damping arrangement according to claim 1, additionally comprising a preloading arrangement (20) associated with the supporting element (16; 16') which preloads the supporting element (16; 16') in direction of the base position ($B_L$).

11. The torsional vibration damping arrangement according to claim 10, wherein the preloading arrangement (20) has a progressive preloading characteristic curve ($K_6$).

12. The torsional vibration damping arrangement according to claim 10, wherein the preloading arrangement is a preloading spring.

13. The torsional vibration damping arrangement according to claim 10, wherein the preloading arrangement has a progressive parabolic preloading characteristic curve ($K_6$).

14. The torsional vibration damping arrangement according to claim 1, additionally comprising a guide (14) for the supporting element (16; 16') at the carrier (12), and wherein the supporting element (16; 16') is guided at the guide (14).

15. The torsional vibration damping arrangement according to claim 14, wherein the supporting element (16; 16') is guided at the guide (14) so as to be moveable substantially in a radial direction with circumferential play.

16. The torsional vibration damping arrangement according to claim 1, wherein the supporting element (16; 16') has a circumferential supporting region (58, 60; 58', 60') on at least one circumferential side of the restoring element (42) for providing the carrier supporting region (62).

17. The torsional vibration damping arrangement according to claim 16, wherein the supporting element (16; 16') has the circumferential support region (58, 60) on both circumferential sides of the restoring element (42).

18. The torsional vibration damping arrangement according to claim 17, wherein the restoring element (42) is arranged between the circumferential supporting regions (58, 60) with circumferential movement play.

19. The torsional vibration damping arrangement according to claim 1, wherein the supporting element (16; 16') has a through-aperture (52) for the restoring element (42) and is movable along the restoring element (42).

20. The torsional vibration damping arrangement according to claim 19, wherein the supporting element has a center of mass (M) and wherein the center of mass (M) lies in the region of the through aperture (52).

21. The torsional vibration damping arrangement according to claim 1, wherein the at least one deflection mass pendulum unit (72; 72') is arranged in a housing (152) which is filled or fillable with fluid.

22. The torsional vibration damping arrangement according to claim 1, wherein the restoring element (42) extends substantially radially when deflection mass (34) is positioned in a basic relative position with respect to the carrier (12).

23. The torsional vibration damping arrangement according to claim 1, wherein a plurality of deflection mass pendulum units (72; 72') are provided at a substantially uniform circumferential distance relative to one another around the axis of rotation (A).

24. A drivetrain for a vehicle, comprising at least one torsional vibration damping arrangement (10) according to claim 1.

25. The drivetrain according to claim 24, wherein the drivetrain (100) comprises as a starting element one of a hydrodynamic torque converter (150), fluid clutch, wet friction clutch and dry friction clutch (132), and that at least one torsional vibration damping arrangement (10) is provided in the region of the starting element.

26. The drivetrain according to claim 25, wherein the starting element (150) comprises a turbine (140), and in that the turbine (140) provides at least a portion of the deflection mass (30) of the torsional vibration damping arrangement (10).

27. The drivetrain according to claim 24, wherein the drivetrain (100) comprises a damper spring arrangement (180; 184) and wherein at least one torsional vibration damper (110, 112; 132, 136) with a primary side and a secondary side which is rotatable with respect to the primary side against the restoring action of a damper spring arrangement (180, 184), and wherein at least one torsional vibration damping arrangement (10) is provided in the region of the at least one torsional vibration damper (110, 112).

28. The drivetrain according to claim 27, wherein two torsional vibration dampers (110, 112) are provided in series with one another in the torque path, wherein a secondary side of one torsional vibration damper (110) is coupled with a primary side of the other torsional vibration damper (112) for providing an intermediate mass (114), and wherein at least one torsional vibration damping arrangement (10) is provided in the region of the intermediate mass (114).

29. A torsional vibration damping arrangement comprising:
at least one deflection mass pendulum unit (72') having a carrier (12) which is rotatable around an axis of rotation (A);
a deflection mass (34) which can be deflected around the axis of rotation (A) in circumferential direction with respect to the carrier (12);
a deformable restoring element (42) which is supported or supportable in a carrier supporting region (62') with respect to the carrier (12) and in a deflection mass supporting region (64) with respect to the deflection mass (34), wherein a deflection of the deflection mass (34) in at least one direction from a basic relative position with respect to the carrier (12) causes a deformation of the restoring element (42);
a supporting element (16') which is radially movably supported at the carrier (12) and provides the carrier supporting region (62'), wherein a distance between the carrier supporting region (62') and the deflection mass supporting region (64) can be varied through movement of the supporting element (16') at the carrier (12), and the supporting element (16') is preloaded in direction of a radially inner base position ($B_L$) and is displaceable radially outward proceeding from the base position ($B_L$) against the preloading under centrifugal force action during rotation of the carrier (12) around the axis of rotation (A), wherein the supporting element (16') has a circumferential supporting region (58', 60) for providing the carrier supporting region (62) at only one circumferential side of the restoring element (42).

* * * * *